(12) United States Patent
Jin et al.

(10) Patent No.: US 10,354,523 B2
(45) Date of Patent: Jul. 16, 2019

(54) ROAD TRAFFIC CONTROL SYSTEM, METHOD, AND ELECTRONIC DEVICE

(71) Applicant: Alibaba Group Holding Limited, Grand Cayman (KY)

(72) Inventors: Zhongming Jin, Hangzhou (CN); Xiansheng Hua, Hangzhou (CN); Jianqiang Huang, Hangzhou (CN); Chen Shen, Hangzhou (CN); Yongguang Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/986,640

(22) Filed: May 22, 2018

(65) Prior Publication Data
US 2018/0336781 A1 Nov. 22, 2018

(30) Foreign Application Priority Data

May 22, 2017 (CN) .......................... 2017 1 0364565

(51) Int. Cl.
*G08G 1/07* (2006.01)
*G08G 1/01* (2006.01)
*G06K 9/00* (2006.01)

(52) U.S. Cl.
CPC .......... *G08G 1/07* (2013.01); *G06K 9/00718* (2013.01); *G06K 9/00785* (2013.01); *G08G 1/0133* (2013.01); *G08G 1/0145* (2013.01)

(58) Field of Classification Search
None
See application file for complete search history.

(56) References Cited

U.S. PATENT DOCUMENTS 6,490,519 B1    12/2002  Lapidot et al.
9,633,560 B1 *   4/2017  Gao ..................... G08G 1/0145
(Continued)

FOREIGN PATENT DOCUMENTS

CN          202075862 U     12/2011

OTHER PUBLICATIONS

PCT Search Report and Written Opinion dated Aug. 10, 2018 for PCT application No. PCT/US2018/033961, 17 pages.

*Primary Examiner* — Eric Blount
(74) *Attorney, Agent, or Firm* — Lee & Hayes, P.C.

(57) ABSTRACT

A system includes a video traffic information analysis module configured to acquire a traffic condition parameter of a road network from video traffic information; a traffic condition prediction module configured to predict a traffic condition in a future period of time according to the traffic condition parameter to obtain a traffic condition prediction result; an actual traffic condition assessment module configured to assess an actual traffic condition based on the traffic condition parameter and according to a traffic condition evaluation model to obtain an actual traffic condition assessment result; and a traffic control decision module configured to determine a control scheme for a controllable traffic element using an optimization algorithm according to the traffic condition prediction result and the actual traffic condition assessment result. Traffic conflicts between motor vehicles, pedestrians and non-motor vehicles at intersections in a road network are reduced, thus effectively alleviating traffic congestion at the intersections.

20 Claims, 9 Drawing Sheets

(56) References Cited

U.S. PATENT DOCUMENTS

| | | | |
|---|---|---|---|
| 2002/0062207 A1* | 5/2002 | Faghri | G08G 1/00 |
| | | | 703/8 |
| 2006/0106530 A1 | 5/2006 | Horvitz et al. | |
| 2011/0082636 A1* | 4/2011 | Barker | G08G 1/0104 |
| | | | 701/118 |
| 2011/0191011 A1* | 8/2011 | McBride | H04L 41/0823 |
| | | | 701/117 |
| 2012/0226434 A1 | 9/2012 | Chiu | |
| 2016/0027300 A1* | 1/2016 | Raamot | G08G 1/08 |
| | | | 340/922 |

\* cited by examiner

ROAD TRAFFIC CONTROL SYSTEM, METHOD, AND ELECTRONIC DEVICE

CROSS REFERENCE TO RELATED PATENT APPLICATIONS

This application claims priority to Chinese Patent Application No. 201710364565.1, filed on 22 May 2017, entitled "Road Traffic Control System, Method, and Electronic Device," which is hereby incorporated by reference in its entirety.

TECHNICAL FIELD

The present disclosure relates to the field of intelligent traffic, and in particular, to road traffic control systems. The present disclosure also relates to road traffic control methods and apparatuses, other types of road traffic control methods and systems, electronic devices, and computer readable media.

BACKGROUND

In the current environment, traffic is getting increasingly congested as the number of vehicles increases year by year. Especially in the case of large flows of motor vehicles and pedestrians during rush hour, it is particularly important to solve the conflict between motor vehicles and pedestrians, and to ensure the smooth passage of both motor vehicles and pedestrians. As information technology, communication technology, sensor technology, control technology, computer technology, etc., are effectively applied to the entire traffic management system, a more efficient intelligent traffic system for integrated traffic management has been gradually set up.

At present, some traffic optimization schemes have been provided for the intelligent traffic system. One traffic optimization scheme is to simulate traffic flows at intersections of signaling control based on a cellular automaton. The scheme models and simulates dynamic traffic flows at intersections of signaling control using a cellular automaton method, which can implement a complicated traffic condition through simple computation and optimize timing of signals by comparing a simulation result with an original input scheme. Although the traffic condition is simplified, the scheme does not specifically solve the conflict between pedestrians and motor vehicles.

Another traffic optimization scheme is signal timing optimization at single-point intersections under mixed traffic conditions. The scheme is based on running characteristics and compositions of mixed traffic flows of urban road traffic. The influences of the mixed traffic flows on the signal control scheme are generalized into unreasonable allocation of right of way between motor vehicles and slow traffic at intersections and interference of pedestrian crossing signals to motor vehicle flows at road sections. Although the mutual influence between pedestrians and motor vehicles is taken into account, the scheme mainly focuses on the motor vehicles and does not fully consider the passage of the pedestrians.

The existing technical solutions mainly rely on GPS, geomagnetic induction, etc., to obtain traffic flow data from motor vehicles, but do not provide an effective way to comprehensively obtain traffic condition information of pedestrians and non-motor vehicles, leading to obvious data deviations. As a result, these schemes cannot effectively and comprehensively take into account various traffic subjects such as motor vehicles, pedestrians and non-motor vehicles, and are difficult to obtain an optimal control effect.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a road traffic control system, to solve the problem of traffic conflicts between motor vehicles, pedestrians and non-motor vehicles in existing road traffic control schemes.

The present disclosure further provides a type of road traffic control method and apparatus, another type of road traffic control method and system, two types of electronic devices, and two types of computer readable media.

The present disclosure provides a road traffic control system, including:

a video traffic information analysis module configured to acquire a traffic condition parameter of a road network from video traffic information, the traffic condition parameter including at least a motor vehicle traffic condition parameter, and including at least one of a pedestrian traffic condition parameter or a non-motor vehicle traffic condition parameter;

a traffic condition prediction module configured to predict a traffic condition in a future period of time according to the traffic condition parameter to obtain a traffic condition prediction result;

an actual traffic condition assessment module configured to assess an actual traffic condition according to a traffic condition evaluation model based on the traffic condition parameter to obtain an actual traffic condition assessment result; and a traffic control decision module configured to determine a control scheme for a controllable traffic element using an optimization algorithm according to the traffic condition prediction result and the actual traffic condition assessment result.

In implementations, the road traffic control system includes a non-video traffic information acquisition module configured to acquire traffic condition information obtained in a non-video manner and form a corresponding traffic condition parameter.

In implementations, the traffic condition prediction module includes a traffic control parameter extraction sub-module, wherein the traffic control parameter extraction sub-module is configured to analyze and extract a traffic control parameter according to the received traffic condition parameter, and the traffic condition prediction module predicts the traffic condition in the future period of time according to the traffic condition parameter, wherein the traffic condition parameter is the traffic control parameter.

In implementations, the traffic control parameter includes at least one of the following parameters:

a motor vehicle flow, a motor vehicle speed, a motor vehicle queuing length, a pedestrian and/or non-motor vehicle flow, and a pedestrian and/or non-motor vehicle speed.

In implementations, the actual traffic condition assessment module includes a traffic evaluation parameter extraction sub-module, wherein the traffic evaluation parameter extraction sub-module is configured to analyze and extract a traffic evaluation parameter according to the received traffic condition parameter, and the actual traffic condition assessment module assesses the actual traffic condition using the traffic evaluation parameter according to the traffic condition evaluation model based on the traffic condition parameter.

In implementations, the traffic evaluation parameter includes at least one of the following parameters:

a motor vehicle queuing length, a motor vehicle passing capacity, a motor vehicle delay, a pedestrian and/or non-motor vehicle passing capacity, and a pedestrian and/or non-motor vehicle queuing length.

In implementations, the controllable traffic element includes at least one of the following:

a traffic light timing, an increase/decrease of traffic lights, an increase or decrease of left-turn lanes, an increase or decrease of U-turn lanes, an increase or decrease of right-turn lanes, an increase or decrease of straight lanes, a setting of one-way streets, an adjustment to respective numbers of outgoing lanes and incoming lanes, an increase/decrease of traffic lights, an adjustment to respective numbers of left-turn lanes, straight lanes, and/or right-turn lanes, and a setting of one-way streets.

In implementations, determining the control scheme for the controllable traffic element using an optimization algorithm according to the traffic condition prediction result and the actual traffic condition assessment result is implemented in the following manner:

obtaining prediction values of traffic flows of one or more road sections in the road network and prediction values of road traffic at intersections of the one or more road sections according to the traffic condition prediction result;

acquiring a signal cycle and a signal green time of traffic signals at the intersections of the one or more road sections in the road network; and performing timing optimization on the traffic signals at the intersections of the one or more road sections in the road network.

In implementations, the traffic flows of the one or more road sections in the road network include:

the numbers of vehicles, pedestrians and/or non-motor vehicles arriving at a certain section of a road in unit time.

In implementations, the road traffic at the intersections includes at least the following parameters:

a queuing length, a motor vehicle saturation rate, a motor vehicle arrival rate, an intersection pedestrian flow, and an effective red-light time.

In implementations, the optimization algorithm includes a linear planning method. The timing optimization on the signals at the intersections of the one or more road sections in the road network is performed by using the linear planning method, and parameters involved in a constraint condition thereof include a signal cycle, a queuing length, a maximum allowable delay time for pedestrians, and a maximum allowable delay time for motor vehicles, and an optimization objective thereof includes at least minimizing a sum of a delay time for pedestrians or non-motor vehicles and a delay time for motor vehicles.

In implementations, the optimization objective includes:

a difference between motor vehicle flows of the one or more road sections in the road network being less than a preset flow threshold.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to a product of an average vehicle delay time for the motor vehicles on the branches and an instantaneous vehicle flow in the direction;

the delay time for pedestrians at all non-crossroad street crossings in the road flow direction is equal to the product of the sum of instantaneous flows of all street crossings in the flow direction of the road section and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the control scheme is determined by calculating a minimum value of the linear objective function.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, determining the control scheme by calculating the minimum value of the linear objective function includes:

selecting a probability density function according to a negative exponential distribution fulfilled in a time interval between arrivals of motor vehicles at areas where the motor vehicles conflict with pedestrians; and calculating an average pedestrian delay time according to the negative exponential distribution and the probability density function.

In implementations, the total delay time is equal to a sum of the following three parts:

the delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and the average delay time for each motor vehicle on the respective branch is equal to a sum of an average signal delay time of the respective branch in the road flow direction and an average motor vehicle delay time caused by a conflicting area between motor vehicles and pedestrians;

the delay time for pedestrians at all non-crossroad street crossings in the road flow direction being equal to the sum of signal delay times of the street crossings, wherein the signal delay time of each street crossing is equal to a signal delay time of the street crossing multiplied by an instantaneous pedestrian flow of the street crossing; and the crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to the minimum value of the total delay time.

In implementations, a controllable traffic element of the one or more road sections in the road network is optimized according to the control scheme, and after optimization, an optimized traffic condition is assessed according to the traffic condition evaluation model based on a traffic condition parameter that is obtained after optimization to obtain an optimized traffic condition assessment result.

In implementations, the traffic condition assessment result includes:

a balance degree between traffic flows of the one or more road sections in the road network, congested road sections in the road network, and the number of the congested road sections.

In implementations, the control scheme for a controllable traffic element includes at least one of the following road traffic optimization manners:

increasing/decreasing traffic lights, adjusting the numbers of left-turn lanes, straight lanes and/or right-turn lanes, setting one-way streets, and generating road planning suggestions and/or road expansion and optimization suggestions.

The present disclosure further provides a road traffic control method, including:

acquiring a traffic condition parameter of a road network from video traffic information, the traffic condition parameter including at least a motor vehicle traffic condition parameter, and including at least one of a pedestrian traffic condition parameter and a non-motor vehicle traffic condition parameter;

predicting a traffic condition in a future period of time according to the traffic condition parameter to obtain a traffic condition prediction result;

assessing an actual traffic condition based on the traffic condition parameter and according to a traffic condition evaluation model to obtain an actual traffic condition assessment result; and determining a control scheme for a controllable traffic element using an optimization algorithm according to the traffic condition prediction result and the actual traffic condition assessment result.

The present disclosure further provides a road traffic control apparatus, including:

a video traffic information analysis unit configured to acquire a traffic condition parameter of a road network from video traffic information, the traffic condition parameter including at least a motor vehicle traffic condition parameter, and including at least one of a pedestrian traffic condition parameter and a non-motor vehicle traffic condition parameter;

a traffic condition prediction unit configured to predict a traffic condition in a future period of time according to the traffic condition parameter to obtain a traffic condition prediction result;

an actual traffic condition assessment unit configured to assess an actual traffic condition based on the traffic condition parameter and according to a traffic condition evaluation model to obtain an actual traffic condition assessment result; and a traffic control decision unit configured to determine a control scheme for a controllable traffic element using an optimization algorithm according to the traffic condition prediction result and the actual traffic condition assessment result.

The present disclosure further provides a second road traffic control method, including:

obtaining a traffic condition prediction result, the traffic condition prediction result including prediction values of traffic flows of one or more road sections in a road network and prediction values of road traffic at intersections of the road sections;

acquiring a traffic condition parameter, the traffic condition parameter including a signal cycle and a signal green time of traffic signals at the intersections of the one or more road sections in the road network; and performing timing optimization on the traffic signals at the intersections of the one or more road sections in the road network based on the traffic condition prediction result.

In implementations, the method includes determining the timing optimization scheme using a linear planning method, wherein if the timing optimization scheme is determined using the linear planning method, parameters involved in a constraint condition thereof include: a signal cycle, a queuing length, a maximum allowable delay time for pedestrians, and a maximum allowable delay time for motor vehicles; and an optimization objective thereof includes at least: minimizing a sum of a delay time for pedestrians or non-motor vehicles and a delay time for motor vehicles.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to a product of an average vehicle delay time for the motor vehicles on branches and an instantaneous vehicle flow in the direction;

the delay time for pedestrians at all non-crossroad street crossings in the road flow direction is equal to a product of a sum of instantaneous flows of all street crossings in the flow direction of the road section and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the timing optimization scheme is determined by calculating a minimum value of the linear objective function.

In implementations, determining the timing optimization scheme by calculating the minimum value of the linear objective function includes:

selecting a probability density function according to a negative exponential distribution fulfilled in a time interval between arrivals of motor vehicles at areas where the motor vehicles conflict with pedestrians; and calculating an average pedestrian delay time according to the negative exponential distribution and the probability density function.

The present disclosure further provides a road traffic control system, including:

a traffic condition prediction module configured to obtain a traffic condition prediction result, the traffic condition prediction result including prediction values of traffic flows of one or more road sections in a road network and prediction values of road traffic at intersections of the road sections;

a traffic condition parameter acquisition module configured to acquire a traffic condition parameter, the traffic condition parameter including a signal cycle and a signal green time of traffic signals at the intersections of the one or more road sections in the road network; and a traffic control optimization module configured to perform timing optimization on the traffic signals at the intersections of the one or more road sections in the road network based on the traffic condition prediction result.

The present disclosure further provides an electronic device, including:

memory, and processor(s);

the memory being configured to store computer executable instructions, and the processor(s) being configured to execute the computer executable instructions:

acquiring a traffic condition parameter of a road network from video traffic information, the traffic condition parameter including at least a motor vehicle traffic condition parameter, and including at least one of a pedestrian traffic condition parameter and a non-motor vehicle traffic condition parameter;

predicting a traffic condition in a future period of time according to the traffic condition parameter to obtain a traffic condition prediction result;

assessing an actual traffic condition based on the traffic condition parameter and according to a traffic condition evaluation model to obtain an actual traffic condition assessment result; and determining a control scheme for a controllable traffic element using an optimization algorithm according to the traffic condition prediction result and the actual traffic condition assessment result.

The present disclosure further provides an electronic device, including:

memory, and processor(s);

the memory being configured to store computer executable instructions, and the processor(s) being configured to execute the computer executable instructions:

obtaining a traffic condition prediction result, the traffic condition prediction result including prediction values of traffic flows of one or more road sections in a road network and prediction values of road traffic at intersections of the road sections;

acquiring a traffic condition parameter, the traffic condition parameter including a signal cycle and a signal green time of traffic signals at the intersections of the one or more road sections in the road network; and performing timing optimization on the traffic signals at the intersections of the one or more road sections in the road network based on the traffic condition prediction result.

The present disclosure further provides a computer readable media, wherein instructions are stored on the computer readable media, and the instructions that, when executed, are used to:

acquire a traffic condition parameter of a road network from video traffic information, the traffic condition parameter including at least a motor vehicle traffic condition parameter, and including at least one of a pedestrian traffic condition parameter and a non-motor vehicle traffic condition parameter;

predict a traffic condition in a future period of time according to the traffic condition parameter to obtain a traffic condition prediction result;

assess an actual traffic condition based on the traffic condition parameter and according to a traffic condition evaluation model to obtain an actual traffic condition assessment result; and determine a control scheme for a controllable traffic element using an optimization algorithm according to the traffic condition prediction result and the actual traffic condition assessment result.

The present disclosure further provides a computer readable media, wherein instructions are stored on the computer readable media, and the instructions that, when executed, are used to:

obtain a traffic condition prediction result, the traffic condition prediction result including prediction values of traffic flows of one or more road sections in a road network and prediction values of road traffic at intersections of the road sections;

acquire a traffic condition parameter, the traffic condition parameter including a signal cycle and a signal green time of traffic signals at the intersections of the one or more road sections in the road network; and perform timing optimization on the traffic signals at the intersections of the one or more road sections in the road network based on the traffic condition prediction result.

Compared with existing technologies, the present disclosure has the following advantages:

A road traffic control system provided in the present disclosure includes: acquiring a traffic condition parameter of a road network from video traffic information, the traffic condition parameter including at least a motor vehicle traffic condition parameter, and including at least one of a pedestrian traffic condition parameter and a non-motor vehicle traffic condition parameter; predicting a traffic condition in a future period of time according to the traffic condition parameter to obtain a traffic condition prediction result; assessing an actual traffic condition based on the traffic condition parameter and according to a traffic condition evaluation model to obtain an actual traffic condition assessment result; and determining a control scheme for a controllable traffic element using an optimization algorithm according to the traffic condition prediction result and the actual traffic condition assessment result.

The road traffic control system acquires traffic data through high-coverage cameras in a city using a video analysis technology. Compared with the methods of obtaining traffic flow data based on GPS or earth inductors, the methods of obtaining traffic flow data in the present disclosure can globally perceive vehicle information and pedestrian information. Therefore, the obtained data is globally unbiased data, and more accurate real-time traffic parameter data can be extracted by analyzing such video data. The solutions of the present disclosure consider a method for controlling mixed traffic of motor vehicles, pedestrians and non-motor vehicles at the same time, and optimize the traffic through single timing and lane optimization for congested motor vehicles and pedestrians in the mixed traffic. The solutions can acquire video data in real time for analysis and constantly optimize the traffic via a feedback mechanism, which finally achieves more balanced traffic flows for motor vehicles in various road sections and reduces the crossing delay of pedestrians, thus effectively alleviating traffic congestion at intersections in a road network.

DETAILED DESCRIPTION

A number of specific details are elaborated in the following description for full understanding of the present disclosure. However, the present disclosure can be implemented in a number of other manners different from those described herein. One skilled in the art can make similar promotion without violating the connotation of the present disclosure, and therefore, the present disclosure is not limited to specific implementations disclosed hereinafter.

The present disclosure provides a road traffic control system. The present disclosure further provides a type of road traffic control method and apparatus, another type of road traffic control method and system, two types of electronic devices, and two types of computer readable media. Detailed descriptions are successively provided hereinafter in the following embodiments.

An embodiment of a road traffic control system provided in the present disclosure is given as follows.

Figure 1:
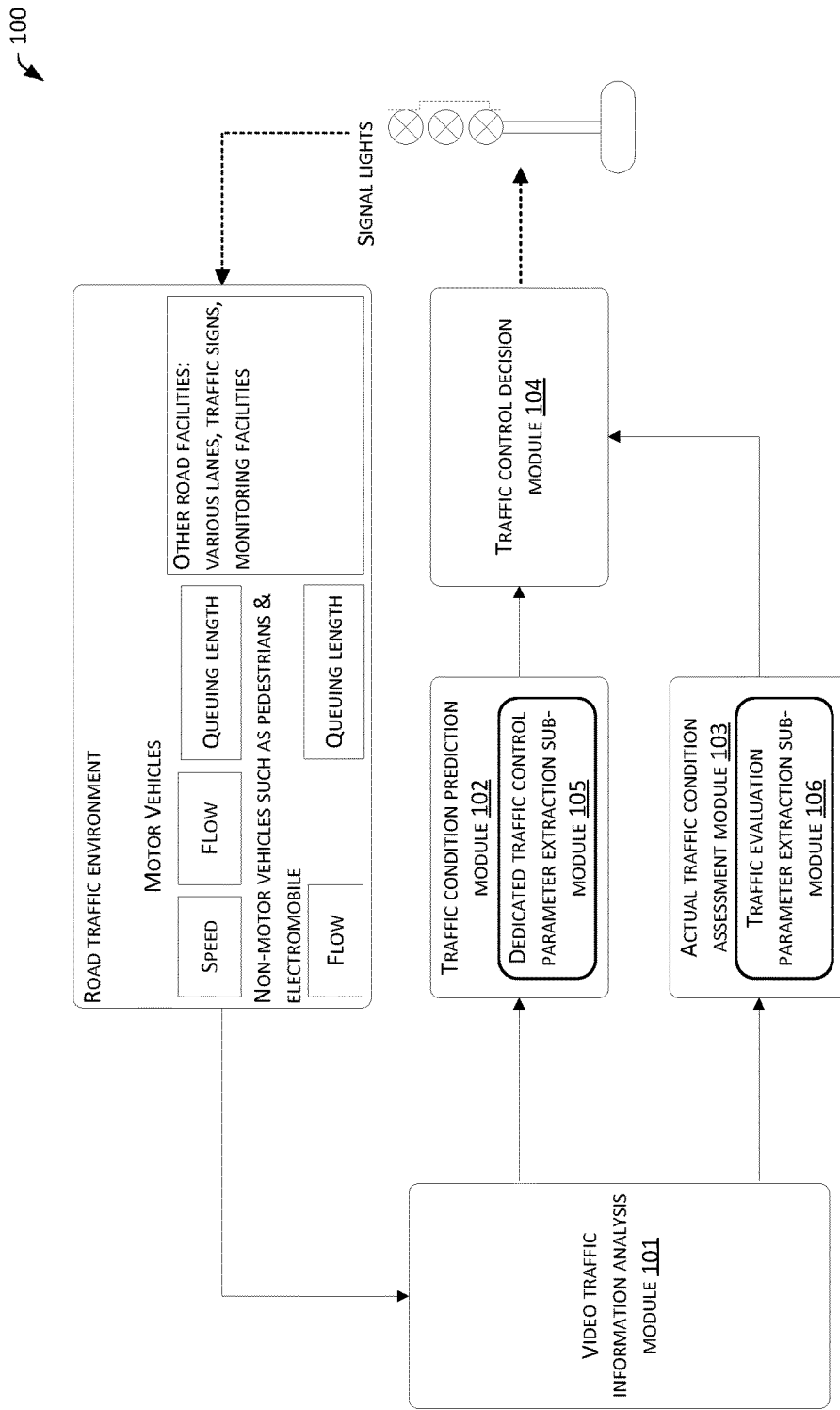
FIG. 1 is a schematic diagram of a road traffic control system according to an embodiment of the present disclosure.
Figure 2:
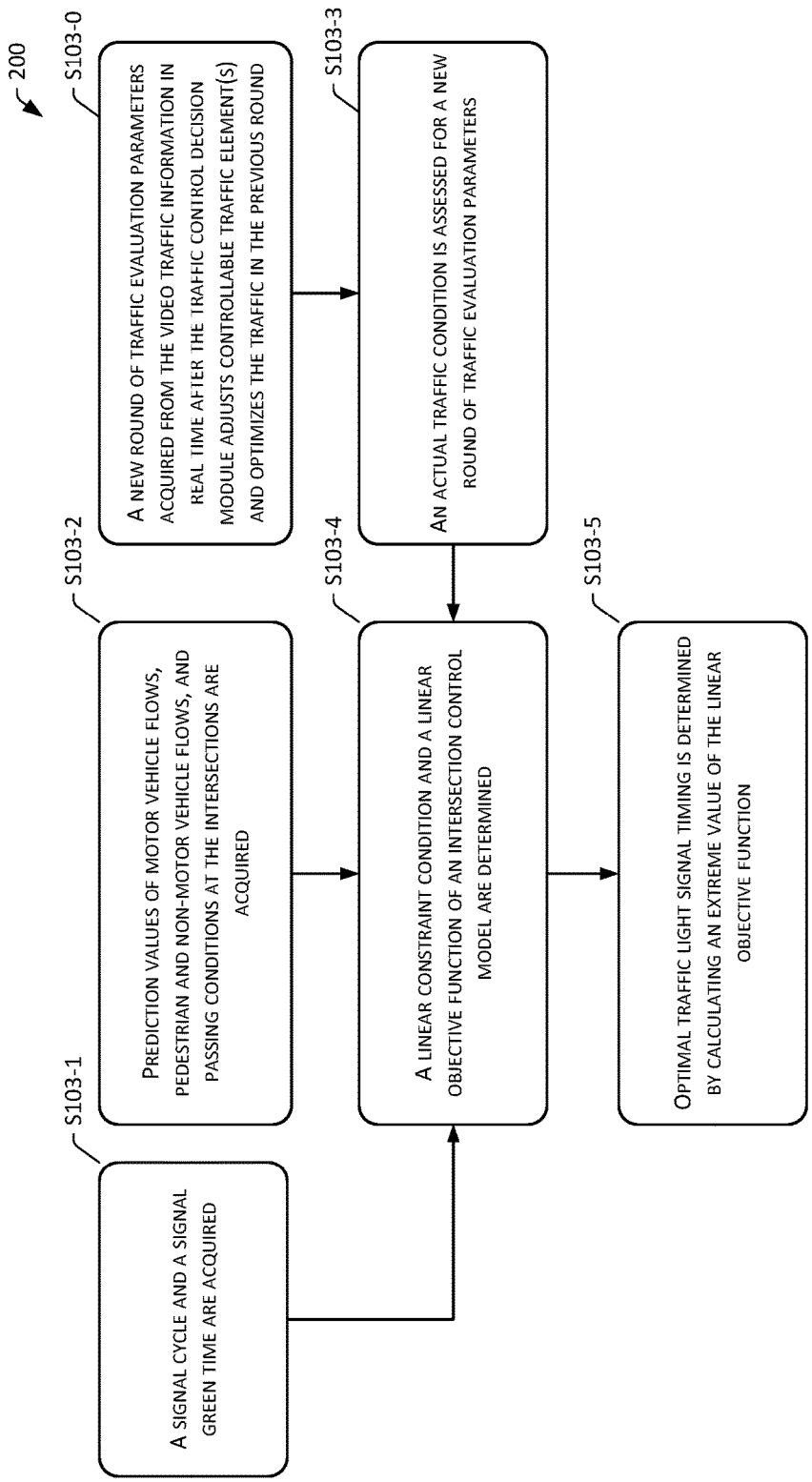
FIG. 2 is a flowchart of operations of a traffic control decision module in a road traffic control system according to an embodiment of the present disclosure.

A road traffic control system according to an embodiment of the present disclosure is described below with reference to FIGS. 1-2. FIG. 1 is a schematic diagram of a road traffic control system 100 according to the present embodiment. FIG. 2 is a flowchart of operations of a traffic control decision module in a road traffic control system according to the present embodiment.

Specifically, FIG. 1 is a schematic diagram of a road traffic control system 100, including a video traffic information analysis module 101, a traffic condition prediction module 102, an actual traffic condition assessment module 103, and a traffic control decision module 104.

An idea of the road traffic control system provided in the present disclosure is given as follows. A traffic condition parameter in an urban road network is acquired using a video analysis technology from video traffic information acquired by high-coverage cameras in a city, the traffic condition parameter including a motor vehicle traffic condition parameter, a pedestrian traffic condition parameter and a non-motor vehicle traffic condition parameter at the same time.

A traffic control parameter is acquired from the traffic condition parameter to predict a traffic condition in a future period of time. A traffic control optimization strategy is determined according to a prediction result. After one round of optimization, actual traffic information is acquired in real time from video information of traffic cameras or video capture cards. The actual traffic condition is evaluated using a traffic condition evaluation model, and an evaluation result is fed back to a traffic control decision module for the next round of optimization, till the flows of various road sections in the urban road network are balanced.

It should be noted that, in implementations, the road traffic control system provided in the embodiments of the present disclosure may also use related traffic information obtained in a non-video manner from conventional devices such as GPSs or earth inductors and in a traffic control optimization decision.

In implementations, the road traffic control system provided in the present disclosure optimizes and adjusts a road traffic environment of an actual road network. In an actual application, the road traffic environment includes traffic participants, vehicles, and road traffic facilities. The traffic participants generally refer to pedestrians, managers, drivers and passengers. The vehicles include private vehicles, public vehicles, commercial vehicles, emergency vehicles, non-motor vehicles, cleaning vehicles, etc. The road traffic facilities include communication facilities, signal control devices, detection and monitoring devices, traffic safety facilities, signs, markings, etc. The road traffic environment is a data source of the road traffic control system provided in the present disclosure. Related information of the road traffic environment, for example, traffic information of pedestrians and non-motor vehicles, traffic information of motor vehicles, and the like, can be acquired using the detection and monitoring devices in the road traffic facilities, such as cameras distributed in the road network. A traffic control optimization strategy is obtained after the road traffic control system analyzes and processes related traffic information of the road traffic environment, and is used for controlling some controllable devices such as signal light devices in the road traffic environment and adjusting the road traffic environment, to achieve the purpose of optimization.

The video traffic information analysis module 101 is configured to acquire a traffic condition parameter of a road network from video traffic information, the traffic condition parameter including at least a motor vehicle traffic condition parameter and including at least one of a pedestrian traffic condition parameter and a non-motor vehicle traffic condition parameter.

The video traffic information analysis module 101 includes a plurality of parts. The video traffic information analysis module 101 first needs to capture video traffic information from various video devices distributed in a traffic network, wherein the video traffic information can be stored in a data storage device such as a database server. Then, the video traffic information analysis module 101 recognizes and analyzes motor vehicles, pedestrians, non-motor vehicles, etc., in the information through a video recognition and video analysis to acquire a traffic condition parameter of a road network. Detailed description thereof is provided hereinafter.

The current road traffic systems, especially an urban road network, have been widely provided with a large number of video capture devices to capture road network information. For example, a ballhead camera that can rotate by 360 degrees is disposed at a crossroad to obtain information in all directions of the crossroad. A fixed gun camera is generally disposed in a general road section for monitoring traffic conditions in a particular direction on the road section. The video traffic information captured by all the video capture devices may be transmitted to a traffic control center via a network, to enable a traffic management department to learn the traffic condition in the road network in real time. The video traffic information generally may also be stored via a data storage device, for uses in future occasions such as division of responsibilities when dealing with a traffic accident is needed.

At present, the utilization of the video traffic information is still at an initial stage, and the actual condition reflecting the abundant road traffic and the regularity of the condition are not extracted. A main problem is that the video traffic information contains a large amount of information about vehicles, pedestrians, non-motor vehicles, etc., which is too messy, complicated, and redundant for traffic management, and most of which is meaningless for the traffic management. For example, the video traffic information contains a large amount of image information about motor vehicles, from which shapes and colors of the motor vehicles can be seen, and brands and models, etc., of the motor vehicles can be analyzed. However, these pieces of information are actually meaningless for the optimization and management on the road traffic.

Therefore, information extraction is needed for the video traffic information to obtain traffic condition parameters that can be used in road traffic management.

The traffic condition parameters refer to numerical information that reflects the road traffic condition and can be directly used in road traffic analysis, for example, a traffic flow and an average travel speed on a road section; the number of waiting vehicles, the number of waiting pedestrians, the number of waiting non-motor vehicles, etc., at an intersection. These traffic condition parameters directly reflect one aspect of utilization of the road traffic by traffic subjects. A prediction for the road traffic condition can be obtained by integrating various traffic condition parameters, and the traffic condition parameters can also be used for assessing a current usage condition of the road traffic.

Specifically, A number of types of traffic condition parameters exist, which can be generally classified into two types, i.e., traffic control parameters and traffic evaluation parameters. These two types are obtained by rough classification according to potential uses only, and there are no strict classification criteria.

The traffic control parameters mainly include a motor vehicle flow, a motor vehicle speed, a motor vehicle passing capacity, a pedestrian and/or non-motor vehicle flow, and a pedestrian and/or non-motor vehicle speed. The traffic evaluation parameters mainly include a motor vehicle queuing length, a motor vehicle delay time, the number of waiting pedestrians and/or non-motor vehicles, and a pedestrian and/or non-motor vehicle delay time.

How to acquire traffic condition parameters of a road network from video traffic information using a video analysis technology is described hereinafter using a motor vehicle flow and a motor vehicle speed as an example.

The motor vehicle flow refers to the number of motor vehicles which pass through a road section in unit time, is used for measuring the utilization of road traffic. The motor vehicle flow can be obtained from video traffic information through analysis in the following manner: treating road traffic video data obtained from a road section on which the motor vehicle flow is to be calculated as the video traffic information, from which motor vehicles are recognized using a video recognition technology; and counting the number of motor vehicles in a direction that appear in the video data in unit time. As such, the vehicle flow in the direction of the corresponding road section can be obtained. A vehicle flow of a road section within a period of time obtained in the above manner is an initial traffic control parameter.

The motor vehicle speed refers to a driving speed of a motor vehicle in unit time. The motor vehicle speed can be obtained from the video traffic information through analysis in the following manner: treating road traffic video data that is obtained as the video traffic information, from which a certain motor vehicle is recognized using a video recognition technology; and calculating changes in a position of the motor vehicle in the video data in unit time, or calculating the time consumed by the motor vehicle for driving a fixed distance. As such, the speed of the motor vehicle can be obtained. For example, during calculation of the motor vehicle speed, the driving distance of the motor vehicle can be estimated based on fixed road traffic distance markers on the road that are present in the video information. As such, the driving speed of the motor vehicle can be obtained merely by referring to the time line information of the video. On the basis of obtaining the driving speed of a specific motor vehicle in the above manner, a secondary parameter related to the driving speed of the motor vehicle can be further obtained. For example, driving speeds of motor vehicles that are present in the same video are separately calculated. Thereafter, an average driving speed of the motor vehicles on a road section in a period of time reflected by the video is obtained, or a distribution of the driving speeds of the motor vehicles on the road section in the period of time reflected by the video is obtained, etc. These pieces of additionally processed data can be better used as parameters for predicting a future condition of the road section in subsequent uses.

The above described parameters obtained in the manner of obtaining the motor vehicle flow and the motor vehicle speed according to the video traffic information are primary data, which, on this basis, can be further processed into secondary data. For example, for motor vehicle flow data, an average vehicle flow can be calculated by counting vehicle flows in a relatively long period of time. Vehicle flows in different periods of time can also be counted respectively according to video data in the different periods of time, to further analyze changes in the vehicle flows in the different periods of time. For motor vehicle speeds, driving speeds of motor vehicles present in the same video can be calculated respectively, and then an average driving speed of the motor vehicles on a road section in a period of time reflected by the video is obtained, or a distribution of the driving speeds of the motor vehicles on the road section in the period of time reflected by the video is obtained, etc. Changes in the motor vehicle speeds in different periods of time can be further obtained in a relatively large time dimension. Distribution of speeds of motor vehicles on different road sections, etc., can be further obtained by combining video traffic information obtained from the different road sections. These pieces of data help learning the driving conditions of the motor vehicles on the roads as a whole, so as to realize a prediction on traffic conditions on various road sections at a time point in the future. In implementations, in combination with GPS devices provided in motor vehicles, GPS data can be further obtained to calculate the driving speeds of the motor vehicles and the motor vehicle flow. As not all the motor vehicles currently use a GPS device, the non-video traffic information and the video traffic information can also be combined to obtain more accurate traffic condition parameters related to the motor vehicles.

Similar to the above two types of traffic condition parameters, other traffic condition parameters of a road network can also be acquired by applying a video analysis technology on the video traffic information. The motor vehicle passing capacity reflects the maximum number of motor vehicles that pass on a road section in a period of time.

In the present embodiment, a main advantage of taking the video traffic information as an information source is that the video traffic information can also reflect conditions of other road users other than the motor vehicles. The road users mainly include pedestrians and non-motor vehicles. According to different objectives, a situation in which only pedestrians may be considered, or a situation in which only non-motor vehicles may be considered may exist. However, in general, the optimization on road traffic needs to take all the road users into account, that is, traffic condition parameters of both pedestrians and non-motor vehicles need to be acquired. Similar to the situation of acquiring the motor vehicle data, specific pedestrians are recognized from the video traffic information using the video analysis technology, and information such as a pedestrian speed and a pedestrian flow is acquired.

Using the technical solutions provided in the present embodiment, a relatively abundant traffic condition can be obtained as the video traffic information is mainly used. The pedestrian traffic condition parameter and the non-motor vehicle traffic condition parameter are both pieces of information that cannot be obtained through GPS, etc., only.

The traffic condition prediction module 102 is configured to predict a traffic condition in a future period of time according to the traffic condition parameters to obtain a traffic condition prediction result.

The core of optimization of road traffic is to predict a future time point according to a dynamic road traffic condition, and thereby to make a proper decision to make full use of the controllable traffic element to adjust the traffic, thus maximizing the potential use of the road traffic. The function of the module is to predict the traffic condition according to the traffic condition parameters.

In the present embodiment, the traffic condition parameters mainly refer to traffic condition parameters acquired from the video traffic information, and may also, however, include non-video traffic condition parameters. In order to acquire traffic condition parameters obtained in a non-video manner, an acquisition module for specifically processing non-video traffic information can be deployed. The acquisition module is configured to acquire traffic condition information obtained in a non-video manner, and perform processing and computation to form corresponding traffic condition parameters. Common non-video traffic information includes parameters obtained through GPS, earth inductors, microwaves, coils or the like. Apparently, since most of these parameters can only detect conditions of motor vehicles, data thereof has some limitations, and can nevertheless complement video traffic information. For example, the speed of a motor vehicle can often be obtained more accurately according to a GPS signal from the motor vehicle.

As can be seen from the above, the traffic condition parameters include many types of parameters. Some basic parameters can be further processed into secondary parameters. Therefore, these parameters need to be analyzed comprehensively to obtain a traffic control parameters that are easy to be used. For example, when a motor vehicle flow parameter in a direction of a road section and a motor vehicle speed parameter in the same direction of the same road section are acquired, the number and the approximate speeds of vehicles driving on the road section can be obtained through analysis. A road traffic condition can be predicted in a better manner by combining these pieces of data.

To utilize the traffic condition parameters in a better way, the traffic condition prediction module 102 can include a dedicated traffic control parameter extraction sub-module 105. The dedicated traffic control parameter extraction sub-module 105 analyzes and extracts traffic control parameters according to the received traffic condition parameters. The traffic condition prediction module 102 predicts a traffic condition in a future period of time according to the traffic condition parameters, wherein the traffic condition parameters are the traffic control parameters.

As stated above, the traffic control parameters are a part of the traffic condition parameters, and meaning thereof can be determined as needed. The traffic control parameter extraction sub-module can extract some suitable parameters from the traffic condition parameters provided by the video traffic information analysis module to serve as traffic control parameters. However, more importantly, various traffic condition parameters that are obtainable can be processed comprehensively to obtain traffic control parameters which are more convenient for prediction.

For example, after a motor vehicle flow and a distribution of motor vehicle speeds in a recent period of time are obtained for a certain road section, a vehicle flow on a front road section after a period of time can be calculated and estimated according to these two types of the above data. As such, red and green lights at the exit of the front road section can be adjusted, so that a time length of the green light can match the estimated vehicle flow.

The traffic condition prediction result is a prediction of a traffic condition in a future time point obtained in the above manner.

Apparently, the future time point can be ten minutes in the future, or ten o'clock in the morning of a certain day in the future. Different estimation methods can be used for future time points at different time distances from a current time point. For example, a condition of a road section at ten minutes later can be accurately inferred according to traffic condition parameters obtained in real time, thus adjusting red and green traffic lights. Specific time points may also be selected respectively in working hours and off-working hours of working days based on traffic condition parameters for variations in traffic conditions of working days previously accumulated, and different road distribution schemes are separately used to determine specific change time points of reversible lanes. In brief, a traffic condition prediction result can be obtained using different calculation methods according to different requirements.

The actual traffic condition assessment module 103 is configured to assess an actual traffic condition according to a traffic condition evaluation model based on the traffic condition parameters to obtain an actual traffic condition assessment result.

There are obvious defects in performing a traffic control based only on a prediction of a road traffic condition at a future time point. Specifically, the road traffic condition is dynamically changing and is very random, and is often different from the actual traffic condition. As such, the actual traffic condition is needed to be assessed. In addition, an assessment of the actual traffic condition can preferably select appropriate traffic condition parameters from the perspective of a road traffic subject so as to obtain a more reasonable perspective for evaluation.

Same as the traffic condition prediction module 102, the traffic condition parameters mainly refer to traffic condition parameters acquired from the video traffic information analysis module, and may also include non-video traffic condition parameters. The traffic condition parameters obtained in a non-video manner can also be acquired from a non-video traffic information acquisition module which is specifically deployed, which details are not redundantly described herein. In brief, the actual traffic condition assessment module 103 and the traffic condition prediction module 102 have no difference from the perspective of the sources for acquiring the traffic condition parameters, and are significantly different in aspects of data selection and uses.

To better utilize the traffic condition parameters, the actual traffic condition assessment module 103 may include a traffic evaluation parameter extraction sub-module 106. The traffic evaluation parameter extraction sub-module 106 is configured to analyze and extract traffic evaluation parameters according to the received traffic condition parameters. The actual traffic condition assessment module 103 assesses the actual traffic condition using the traffic evaluation parameters according to the traffic condition evaluation model based on the traffic condition parameters. As stated above, the traffic evaluation parameters are a part of the traffic condition parameters, and meanings thereof can be determined as needed. The traffic evaluation parameter extraction sub-module 106 can extract some suitable parameters from the traffic condition parameters provided by the video traffic information analysis module to serve as traffic evaluation parameters. More importantly, however, various types of traffic condition parameters that are obtainable can be processed comprehensively to obtain traffic evaluation parameters which are more convenient for evaluating the actual traffic condition.

The traffic evaluation parameters are generally selected from the perspective of experience of traffic subjects, for example, a motor vehicle queuing length, a motor vehicle passing capacity, a motor vehicle delay, a pedestrian and/or non-motor vehicle passing capacity, a pedestrian and/or non-motor vehicle waiting time length, etc. These indicators can meet the feelings of the traffic subjects in a better way, and can be used in decision-making to improve traffic control effects in a better manner.

For example, when motor vehicle delay data and pedestrian waiting time length data for a road section have been obtained, the influences of traffic control effects on traffic subjects can be actually assessed according to these two types of data, thus determining a control direction for improving the traffic condition. The actual traffic condition assessment result is equivalent to a negative feedback in a feedback system in the present embodiment. The actual effects of a control scheme can be assessed according to the actual traffic condition assessment result, and a corresponding adjustment is thereby made. For example, if a waiting time length for pedestrians at a crossroad obviously exceeds a reasonable period of time according to an original scheme, this information can be provided to the traffic control decision module 104, and the traffic control decision module 104 may possibly adjust timing of the traffic lights to allocate more time to pedestrians for passing.

The actual traffic condition assessment module 103 can adjust a control strategy of controllable traffic elements through the traffic control decision module so that the traffic condition after the traffic optimization is assessed in real time. As such, the control scheme can be adjusted in real time after the information is provided to the traffic control decision module 104. Apparently, a traffic condition that has already occurred in a previous period of time can also be assessed, so that adjustments can be made based on the control scheme of this previous period of time. For example, the traffic conditions on the previous day are assessed as a whole, so that the traffic conditions for the next day can be adjusted.

The traffic condition assessment result obtained by the actual traffic condition assessment module 103 can also include the following content: a balanced degree between traffic flows of road sections in the road network, the number of congested road sections, and specific congested road sections.

The traffic control decision module 104 is configured to determine a control scheme for a controllable traffic element using an optimization algorithm according to the traffic condition prediction result and the actual traffic condition assessment result.

The function of this module 104 is to generate a reasonable control scheme for a controllable traffic element to realize the adjustment to the traffic. The information on which the module is based includes the traffic condition prediction result from the traffic condition prediction module 102 and the actual traffic condition assessment result from the actual traffic condition assessment module 103.

The controllable traffic elements mainly refer to elements that can be controlled in the road traffic at any time such as traffic light timing and lane adjustment. The characteristics of these traffic control elements are being adjustable according to needs at any time to realize an adjustment to the traffic at any time. The traffic light timing refers to how to allocate times of traffic lights to the red light and the green light, thus changing the right of way. The overall traffic efficiency at a crossroad can be guaranteed through reasonable adjustment. The lane adjustment includes an increase or a decrease of left-turn lanes, an increase or a decrease of U-turn lanes, an increase or a decrease of right-turn lanes, an increase or a decrease of straight lanes, a setting of one-way street(s), an adjustment to the numbers of outgoing lanes and incoming lanes, etc. The measures can be adjusted at any time through indicator lights disposed on some roadways.

Apparently, the controllable traffic elements can also include improvements and suggestions that cannot be adjusted in real time but can be proposed for the road traffic based on traffic condition parameters accumulated for a long time. For example, at least one of the following suggestions for the road construction mode is included: increasing/decreasing the traffic lights, adjusting the setting of the number of left-turn lanes and/or straight lanes and/or right-turn lanes and the setting of one-way streets, and giving road planning suggestions and/or road construction and/or expansion and optimization suggestions. Although these measures cannot be implemented in real time, adjustments can be made when repairs and adjustments may be performed for the road traffic after enough data is accumulated and the overall situation of the road traffic condition is known, thus improving the road traffic. These can also be considered as a part of the control scheme for the controllable traffic elements.

Apparently, the core of the module 104 lies in an optimization algorithm, that is, which specific method is used for obtaining the control scheme for the controllable traffic elements using the traffic condition prediction result and the actual traffic condition assessment result.

Undoubtedly, a number of optimization algorithms that can be used exist. For example, through a long-term collection and accumulation of traffic condition parameters, macro guidance can be performed for adjustments of road traffic construction according to macro regularity data, especially time-related regularity data. The traffic light timing, the lane allocation, etc., can also be adjusted in real time according to the traffic condition prediction result obtained from the traffic condition parameters in a recent period of time and the actual traffic condition assessment result. The optimization algorithm for adjusting traffic light timing and lane allocation in real time is mainly described hereinafter.

In implementations, the optimization algorithm may be a linear planning method.

The traffic system is very complex, and the traffic condition parameters include a plurality of variables associated with each other. For example, the speeds of motor vehicles and the crossing delays of pedestrians affect one another. An optimal adjustment strategy for controllable traffic elements can be made based on the traffic condition parameters, such that motor vehicles, pedestrians, and non-motor vehicles can travel smoothly in all road sections with the shortest delay times, thus solving the problem of congestion in a road network as much as possible.

According to these characteristics of the road traffic condition, a linear planning objective function adopted in the present embodiment is a sum of a delay time for motor vehicles and a total delay time for pedestrians and non-motor vehicles, and a constraint condition involved therein includes the following parameters: a signal cycle, a queuing length, a maximum allowable delay time for pedestrians, and a maximum allowable delay time for motor vehicles. A minimum value of the linear objective function is obtained according to the constraint condition, from which optimal timings for signal lights are calculated. Details of operations 200 are shown in FIG. 2.

Operation S103-1: A signal cycle and a signal green time are acquired.

The signal green time refers to an effective time of a green light for a traffic signal light that can be used for a saturated traffic flow in a signal cycle. In the present embodiment, the signal green time is calculated by subtracting a time duration that is lost in initiation from a sum of an actual time duration for a green light and an actual time duration for a yellow light.

This operation is to obtain a signal cycle of signal lights at intersections of various road sections in a road network, and the traffic light timing of the signal lights. The data can generally be obtained from a signal light control system.

The signal cycle refers to a time duration needed for displaying the signal lights in a defined phase sequence for one round, i.e., a sum of step lengths of control steps in a loop.

Operation S103-2: Prediction values of motor vehicle flows, pedestrian and non-motor vehicle flows, and passing conditions at the intersections are acquired.

This operation is to acquire a traffic condition prediction result by the traffic prediction module. Detailed processing has been described in the processing of the traffic prediction module and is not repeatedly described herein.

Operation S103-3: An actual traffic condition is assessed for a new round of traffic evaluation parameters.

The new round of traffic evaluation parameters is a new round of traffic evaluation parameters acquired from the video traffic information in real time after the traffic control decision module adjusts controllable traffic element(s) and optimizes the traffic in the previous round at operation S103-0. Details of a process of obtaining an actual traffic assessment result by the actual traffic condition assessment module has been given in the description of the actual traffic condition assessment module in detail, and are not repeatedly described herein.

Operation S103-4: A linear constraint condition and a linear objective function of an intersection control model are determined.

In this operation, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads.

The delay time for the motor vehicles in the road flow direction is equal to a sum of delay times for the motor vehicles on all branches leading to the road flow direction. The delay time for the motor vehicles on branches is equal to a product of an average vehicle delay time for the motor vehicles on the branches and an instantaneous vehicle flow in the direction.

The delay time for the pedestrians at all the non-crossroad street crossings in the road flow direction is equal to a product of a sum of instantaneous flows of all street crossings in the flow direction of the road section and an average crossing delay time for the pedestrians at the non-crossroads.

The crossing delay time for the pedestrians at all the crossroads is equal to a product of a sum of pedestrian crossing flows at the crossroads of all branches in the road flow direction and an average delay time for the pedestrians at the crossroads.

The control scheme is determined by calculating a minimum value of the linear objective function, and a constraint condition involved therein includes the following parameters: a signal cycle, a queuing length, a maximum allowable delay time for pedestrians, and a maximum allowable delay time for motor vehicles.

The specific linear objective function expression in the present embodiment is given as follows:

$$D_{ij}=\Sigma_k d_k q_k + d_p \Sigma_k q_{k\,pedestrian} + d_{ij} \Sigma_n q_{n\,pedestrian}$$

where i and j denote two signal lights, and a road flow direction is i→j, $D_{ij}$ denotes a total delay time in the i→j direction, $d_k$ denotes an average vehicle delay time on the $k^{th}$ branch leading to the road i→j, $q_k$ denotes an instantaneous vehicle flow on the $k^{th}$ branch in a direction to the road i→j, $d_{ij}$ denotes an average crossing delay time for pedestrians at an non-crossroad in the i→j direction, $q_{n\,pedestrian}$ denotes an instantaneous flow of n street crossings, $d_p$ denotes an average delay time for pedestrians at a crossroad, and $q_{k\,pedestrian}$ denotes a pedestrian crossing flow at a crossroad on the $k^{th}$ branch leading to the road i→j. An optimal timing scheme is obtained by calculating a minimum value of the objective function under the constraint condition.

In the present embodiment, parameters used for calculating the total delay time include: prediction values of traffic conditions at the intersections of all the road sections in the road network, prediction values of traffic flows on all the road sections in the road network, and original signal cycles and signal green times at the intersections of all the road sections in the road network.

The prediction values of traffic conditions at the intersections of all the road sections in the road network include at least a vehicle queuing length, a motor vehicle saturation rate, a motor vehicle arrival rate, an intersection pedestrian flow, and an effective red-light time. The traffic flows on all the road sections in the road network refer to the numbers of pedestrians and non-motor vehicles as well as motor vehicles arriving at a section of the road in unit time. The prediction values of traffic flows on all the road sections in the road network are obtained by the traffic condition prediction module. The traffic condition prediction module acquires the prediction values of traffic flows from the video traffic information by using a video analysis technology. For the video traffic information involving a large number of motor vehicles, a fixed region is set on each lane in a video image to serve as a virtual detection line using a video recognition technology, and images in the region are then processed. For example, a difference between a current input frame image and a background image is calculated to isolate vehicles. Since the background image needs to be refreshed in real time, and is influenced by factors such as light, camera shake, shaking leaves, water ripples (in rain and fog days), and camera focus drift during real processing, the vehicle flow is recognized more accurately using the Kalman filtering algorithm.

As such, the vehicle flow in the direction of the corresponding road section can be obtained. For the vehicle flow, an average vehicle flow can be calculated by counting vehicle flows in a relatively long period of time. Vehicle flows in different periods of time can also be counted respectively according to video data in the different periods of time, to further analyze changes in the vehicle flows in the different periods of time, from which a prediction value in a next period of time is obtained. In addition, a temporal influence relation between vehicle flows on a certain road section and another road section can also be estimated based on spatial relations between different road sections.

In addition, a temporal influence relation between vehicle flows on a certain road section and another road section can also be estimated based on spatial relations between different road sections.

In addition, the traffic condition parameters may come from different channels. For example, the traffic information can also be provided by an automatic collection means such as an inductive loop coil detector, a magnetic induction detector, a pulse ultrasonic detector, a radar detector, a photoelectric detector, a triboelectric detector, an infrared detector, and a GPS. The video traffic information is mainly used in the present embodiment.

In addition, the traffic flows of pedestrians and non-motor vehicles are also acquired from the video traffic information using the same processing method for the motor vehicles.

Operation S103-5: Optimal traffic light signal timing is determined by calculating an extreme value of the linear objective function.

In this operation, when the extreme value of the linear objective function is calculated, the influence of a conflicting area between motor vehicles and pedestrians on delay times for the motor vehicles and the pedestrians are used as a calculation factor for the total delay time. The total delay time includes a sum of the following three parts:

a delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and the average delay time for each motor vehicle on the respective branch is equal to a sum of an average signal delay time of the respective branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined based on a minimum value of the total delay time.

A reference range of the pedestrians includes non-motor vehicles.

In the present embodiment, the average delay time for each motor vehicle is calculated according to the following operations:

A total delay time for all vehicles in a signal cycle is calculated as:

$$\Sigma t_i = 0.5(t_h + t_s)t_h q$$

wherein $\Sigma t_i$ denotes a total signal delay time of vehicles in a signal cycle, $t_h$ denotes an effective red-light time duration, $t_s$ denotes a time duration required for dispersing queuing vehicles, and q denotes a vehicle flow of arriving vehicles.

According to the number of vehicles arriving in a signal cycle T as q, an average signal delay time for each vehicle is calculated as:

$$t_i = \frac{\sum t_i}{Tq} = \frac{t_h^2 + t_h t_s}{2T};$$

wherein the time required for dispersing the queuing vehicles is $$t_s = \frac{t_h \lambda}{\lambda_m - \lambda},$$

wherein $\lambda_m$ denotes a motor vehicle saturation rate, and $\lambda$ denotes a motor vehicle arrival rate.

In the present embodiment, an average delay time for pedestrians and non-motor vehicles is calculated according to the following operations.

According to a negative exponential distribution met by time intervals between arrivals of motor vehicles at areas where motor vehicles conflict with pedestrians, a probability density function is selected as $f(x)=\lambda e^{-\lambda x}$. Therefore, the probability that a pedestrian crosses a vehicle stream directly is $p(x>\tau)=e^{-\lambda \tau}$, wherein x denotes the number of intervals during which pedestrians wait for vehicles, a distribution of which is $p(x=k)=(1-e^{-\lambda \tau})^k e^{-\lambda \tau}$.

Based on the distribution and the probability function, an average number of waiting intervals for pedestrians that is obtained is $$X = \frac{1 - e^{-\lambda \tau}}{e^{-\lambda \tau}},$$

and thereby a waiting time during which a pedestrian cannot cross the street is found to be $$t = \frac{\int_0^T x f(x) d_x}{\int_0^T f(x) d_x} = \frac{\frac{1}{\lambda} - \left(\tau + \frac{1}{\lambda}\right) e^{-\lambda \tau}}{1 - e^{-\lambda \tau}}.$$

Based on the above information, an average delay time for pedestrians is calculated to be $$d_p = \frac{\frac{1}{\lambda} - \left(\tau + \frac{1}{\lambda}\right) e^{-\lambda \tau}}{e^{-\lambda \tau}}.$$

Based on the average delay time for pedestrians and non-motor vehicles and the average delay time for motor vehicles, a calculation formula for a total delay time on all the road sections in the road network is obtained to be:

$$D_{ij} = \left[ \frac{\lambda_m t_{h\ pedestrian}^2}{2T(\lambda_m - q_{pedestrian})} + \sum_0^k \frac{\frac{1}{q_k} + \left(\tau + \frac{1}{q_k}\right) e^{-q_k \tau}}{1 - e^{-q_k \tau}} \right] q_{pedestrian} +$$

$$\sum_1^k \left[ \frac{\lambda_m t_{h\ vehicle}^2}{2T(\lambda_m - q_{kij})} + \frac{\frac{1}{q_k} + \left(\tau + \frac{1}{q_k}\right) e^{-q_k \tau}}{1 - e^{-q_k \tau}} \right] q_k +$$

$$\sum_0^n \frac{\lambda_m t_{h\ pedestrian}^2}{2T(\lambda_m - q_n)} q_{n\ pedestrian},$$

where $q_{kij}$ denotes an instantaneous flow of arriving vehicles, $\lambda_m$ denotes a motor vehicle saturation rate, $t_{h\ pedestrian}$ denotes an effective red-light time duration for pedestrians and non-motor vehicles, $t_{h\ vehicle}$ denotes an effective red-light time duration for motor vehicles, T denotes a signal cycle, $$\frac{\lambda_m t_{h\ vehicle}^2}{2T(\lambda_m - q_{kij})}$$

denotes an average signal delay time for each vehicle, and $$\frac{\lambda_m t_{h\ vehicle}^2}{2T(\lambda_m - q_{kij})}$$

denotes an average signal delay time for each pedestrian or each non-motor vehicle.

$t_{h\ pedestrian}$ and $t_{h\ vehicle}$ are calculated by calculating a minimum value of $D_{ij}$ to obtain the timings of traffic lights for pedestrians and non-motor vehicles and the timings of traffic lights for motor vehicles.

In addition, the delay time of each part can also be calculated in another form when these three parts included are actually calculated according to the formula for the total delay time on the road sections in the road network. For example, the delay time for pedestrians on crossing streets at all non-crossroads in the road flow direction is obtained by multiplying the sum of instantaneous pedestrian flows on each crossing street by an average crossing delay time for pedestrians at the non-crossroads. The pedestrian crossing delay time at the crossroad is equal to the sum of the delay times for pedestrians on branches. The delay time for pedestrians on each branch is equal to the product of an average delay time for pedestrians on the branch and an instantaneous flow of the pedestrians on the branch in the road flow direction. The average delay time for pedestrians on the branch is equal to the sum of an average signal delay time for pedestrians and a delay time for pedestrians caused by a conflicting area between motor vehicles and pedestrians.

It should be noted that the optimization objective of the algorithm may also include balancing the traffic flows on all the road sections in the road network. A difference between the motor vehicle flows on the road sections in the entire road network is calculated, and the traffic flows on the road sections are considered to be balanced if the difference is determined to be less than a predetermined threshold.

In addition, in the present embodiment, road planning suggestions and road expansion and optimization suggestions can be given for the urban road construction according to the historical accumulation data of the control scheme for controllable traffic elements. For example, it is suggested to increase the left-turn forbiddance lane during the congestion period to solve the problem of long-term congestion caused by an overlong left-turn queue on the trunk road. The road optimization suggestions further include: increasing or decreasing the traffic lights, adjusting the numbers of left-turn, straight, and right-turn lanes, setting one-way streets, and so on.

An embodiment of a road traffic control method provided in the present disclosure is given as follows.

Road traffic control systems are provided in the foregoing embodiments, and correspondingly, the present disclosure further provide a road traffic control methods. Description is given hereinafter with reference to the accompanying drawing.

Figure 3:
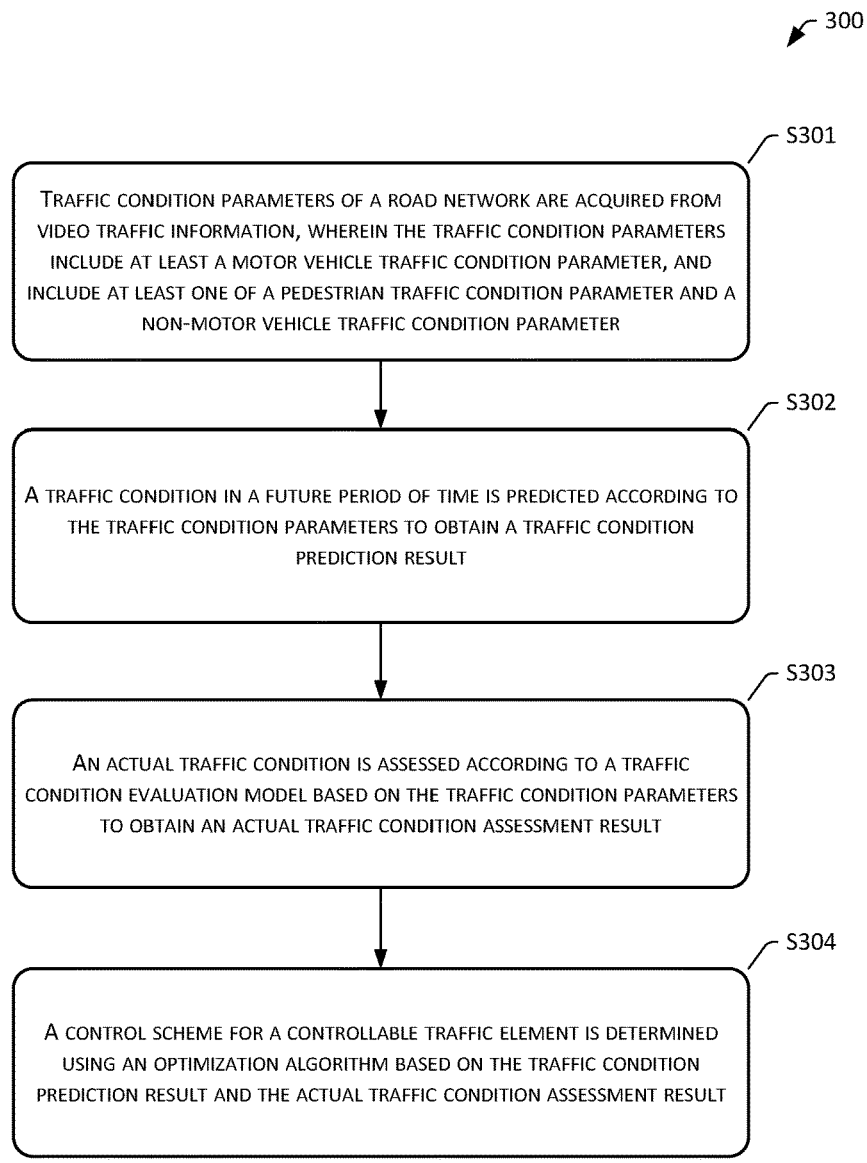
FIG. 3 is a flowchart of a process of a road traffic control method according to an embodiment of the present disclosure.

FIG. 3 shows a flowchart of a process of a road traffic control method 300 according to the present disclosure.

Since the method embodiments are basically similar to the system embodiments, the description thereof is relatively simple. Reference can be made to the corresponding description of the system embodiments provided above for related parts. The method embodiments described hereinafter are merely illustrative.

The present disclosure provides a road traffic control method, including the following operations.

Operation S301: Traffic condition parameters of a road network are acquired from video traffic information, wherein the traffic condition parameters include at least a motor vehicle traffic condition parameter, and include at least one of a pedestrian traffic condition parameter and a non-motor vehicle traffic condition parameter.

Operation S302: A traffic condition in a future period of time is predicted according to the traffic condition parameters to obtain a traffic condition prediction result.

Operation S303: An actual traffic condition is assessed according to a traffic condition evaluation model based on the traffic condition parameters to obtain an actual traffic condition assessment result.

Operation S304: A control scheme for a controllable traffic element is determined using an optimization algorithm based on the traffic condition prediction result and the actual traffic condition assessment result.

In implementations, the road traffic control method includes acquiring traffic condition information obtained in a non-video manner, and forming a corresponding traffic condition parameter.

In implementations, predicting the traffic condition in the future period of time according to the traffic condition parameters to obtain the traffic condition prediction result includes the following sub-operation:

analyzing and extracting a traffic control parameter according to the received traffic condition parameter; the traffic condition in the future period of time being predicted according to the traffic condition parameter when predicting the traffic condition in the future period of time according to the traffic condition parameter to obtain the traffic condition prediction result, wherein the traffic condition parameter is the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, assessing the actual traffic condition according to the traffic condition evaluation model based on the traffic condition parameters to obtain the actual traffic condition assessment result includes the following sub-operation:

analyzing and extracting a traffic evaluation parameter according to the received traffic condition parameter, the actual traffic condition being assessed using the traffic evaluation parameter when assessing the actual traffic condition according to the traffic condition evaluation model based on the traffic condition parameters to obtain the actual traffic condition assessment result.

In implementations, the traffic evaluation parameter includes at least one of the following parameters: a motor vehicle queuing length, a motor vehicle passing capacity, a motor vehicle delay, a pedestrian and/or non-motor vehicle passing capacity, and a pedestrian and/or non-motor vehicle queuing length.

In implementations, the controllable traffic element includes at least one of the following:

a traffic light timing, an increase/decrease of traffic lights, an increase or decrease of left-turn lanes, an increase or decrease of U-turn lanes, an increase or decrease of right-turn lanes, an increase or decrease of straight lanes, a setting of one-way streets, an adjustment to the numbers of outgoing lanes and incoming lanes, an increase/decrease of traffic lights, an adjustment to the numbers of left-turn lanes, straight lanes, and/or right-turn lanes, and a setting of one-way streets.

In implementations, determining the control scheme for the controllable traffic element using the optimization algorithm according to the traffic condition prediction result and the actual traffic condition assessment result is implemented in the following manner:

obtaining prediction values of traffic flows of one or more road sections in the road network and prediction values of road traffic at intersections of the one or more road sections according to the traffic condition prediction result;

acquiring a signal cycle and a signal green time of traffic signals at the intersections of the one or more road sections in the road network; and performing timing optimization on the traffic signals at the intersections of the one or more road sections in the road network.

In implementations, the traffic flows of the one or more road sections in the road network include: the numbers of vehicles, pedestrians and/or non-motor vehicles arriving at a section of a road in unit time.

In implementations, the road traffic at the intersections includes at least the following parameters: a queuing length, a motor vehicle saturation rate, a motor vehicle arrival rate, an intersection pedestrian flow, and an effective red-light time.

In implementations, the optimization algorithm includes: a linear planning method. The timing optimization on the signals at the intersections of the one or more road sections in the road network is performed by using the linear planning method, and parameters involved in a constraint condition thereof include: a signal cycle, a queuing length, a maximum allowable delay time for pedestrians, and a maximum allowable delay time for motor vehicles; and an optimization objective thereof at least includes minimizing a sum of a delay time for pedestrians or non-motor vehicles and a delay time for motor vehicles.

In implementations, the optimization objective includes a difference between motor vehicle flows of the one or more road sections in the road network being less than a preset flow threshold.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for the motor vehicles in the road flow direction is equal to a sum of delay times for motor vehicles on all branches leading to the road flow direction; and a delay time for motor vehicles on a branch is equal to a product of an average vehicle delay time for the motor vehicles on the branch and an instantaneous vehicle flow in the direction;

the delay time for pedestrians at all the non-crossroad street crossings in the road flow direction is equal to a product of a sum of instantaneous flows of all street crossings in the flow direction of the road section and an average crossing delay time for pedestrians at the non-crossroads;

the crossing delay time for pedestrians at all the crossroads is equal to a product of a sum of pedestrian crossing flows at crossroads of all branches in the road flow direction and an average delay time for pedestrians at the crossroads; and the control scheme is determined by calculating a minimum value of the linear objective function.

In implementations, determining the control scheme by calculating the minimum value of the linear objective function includes:

calculating a total delay time for all vehicles in a signal cycle; and calculating an average delay time for each vehicle in the signal cycle according to the number of vehicles arriving in the signal cycle.

In implementations, determining the control scheme by calculating the minimum value of the linear objective function includes:

selecting a probability density function according to a negative exponential distribution met by time intervals between arrivals of motor vehicles at areas where the motor vehicles conflict with pedestrians; and calculating an average pedestrian delay time according to the negative exponential distribution and the probability density function.

In implementations, the total delay time is equal to a sum of the following three parts:

the delay time for motor vehicles in the road flow direction being equal to the sum of vehicle delay times for motor vehicles on all branches, wherein the vehicle delay time for motor vehicles on each branch is equal to the product of an average delay time for each motor vehicle on the respective branch and an instantaneous vehicle flow of the respective branch in the road flow direction; and the average delay time for each motor vehicle on the respective branch is equal to the sum of an average signal delay time of the respective branch in the road flow direction and an average motor vehicle delay time caused by a conflicting area between motor vehicles and pedestrians;

the delay time for pedestrians at all non-crossroad street crossings in the road flow direction being equal to the sum of signal delay times of the street crossings, wherein the signal delay time of each street crossing is equal to a signal delay time of the street crossing multiplied by an instantaneous pedestrian flow of the street crossing; and the crossing delay time for all pedestrians at the crossroad being equal to the product of a pedestrian flow at the crossroad and an average pedestrian delay time at the crossroad, wherein the average pedestrian delay time at the crossroad is equal to the sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined based on a minimum value of the total delay time.

In implementations, a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

In implementations, the traffic condition assessment result includes a balance degree between traffic flows of the one or more road sections in the road network, congested road sections in the road network, and the number of the congested road sections.

In implementations, the control scheme for a controllable traffic element includes at least one of the following road traffic optimization manners:

increasing/decreasing traffic lights, adjusting the numbers of left-turn lanes, straight lanes and/or right-turn lanes, setting one-way streets, and generating road planning suggestions and/or road expansion and optimization suggestions.

An embodiment of a road traffic control apparatus provided in the present disclosure is given as follows.

A road traffic control method is provided in the foregoing embodiment, and correspondingly, the present disclosure further provides a road traffic control apparatus. Description is given hereinafter with reference to the accompanying drawing.

Figure 4:
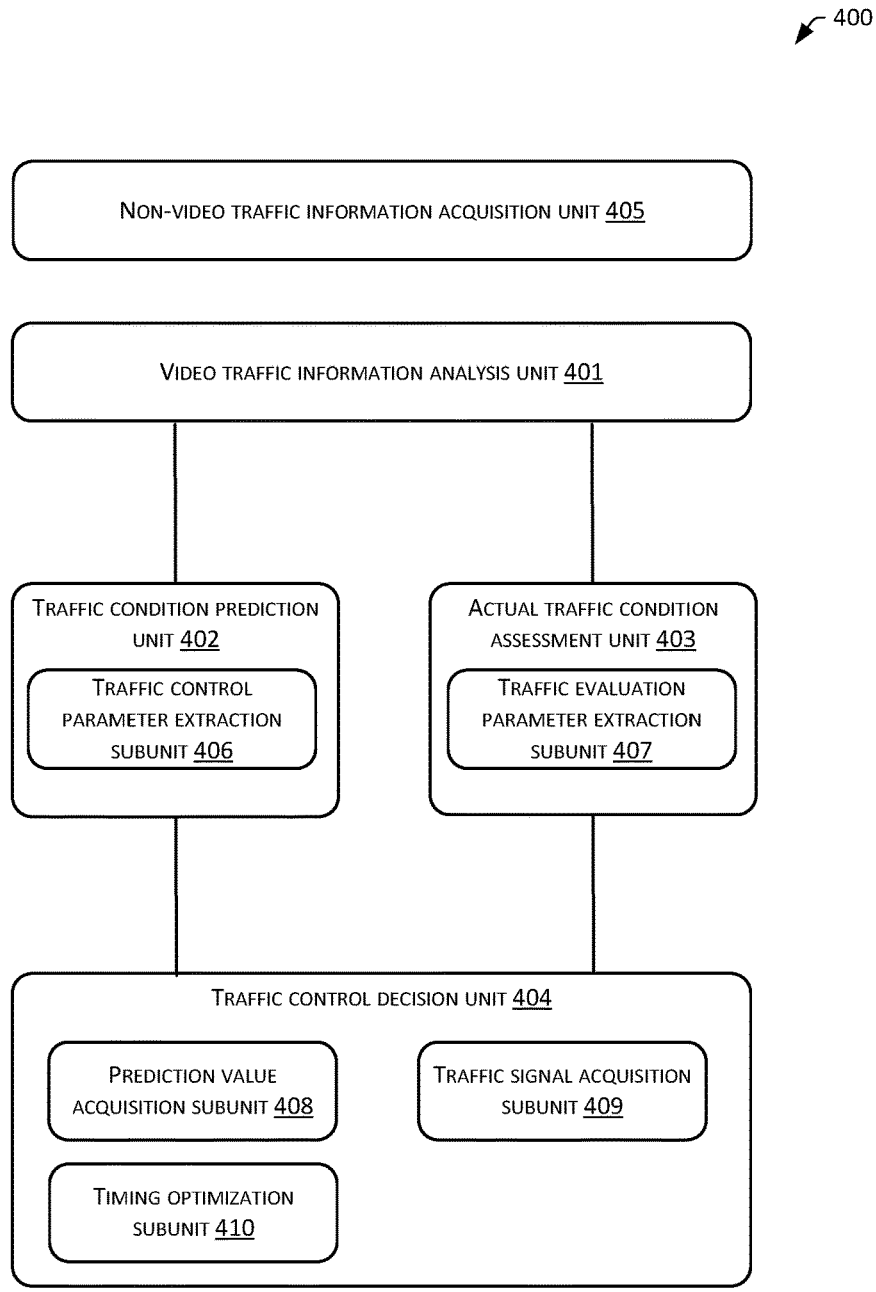
FIG. 4 is a schematic diagram of a road traffic control apparatus according to an embodiment of the present disclosure.

Referring to FIG. 4, a schematic diagram of an embodiment of a road traffic control apparatus 400 according to the present disclosure is shown.

The apparatus embodiment is described in a simple manner due to its basic similarity to the method embodiment. Reference can be made to the corresponding description about the method embodiment provided above for related parts. The apparatus embodiment described below is merely illustrative.

The present disclosure provides a road traffic control apparatus 400, including:

a video traffic information analysis unit 401 configured to acquire traffic condition parameters of a road network from video traffic information, the traffic condition parameters including at least a motor vehicle traffic condition parameter, and including at least one of a pedestrian traffic condition parameter and a non-motor vehicle traffic condition parameter;

a traffic condition prediction unit 402 configured to predict a traffic condition in a future period of time based on the traffic condition parameters to obtain a traffic condition prediction result;

an actual traffic condition assessment unit 403 configured to assess an actual traffic condition according to a traffic condition evaluation model based on the traffic condition parameters to obtain an actual traffic condition assessment result; and a traffic control decision unit 404 configured to determine a control scheme for a controllable traffic element using an optimization algorithm according to the traffic condition prediction result and the actual traffic condition assessment result.

In implementations, the road traffic control apparatus 400 includes:

a non-video traffic information acquisition unit 405 configured to acquire traffic condition information obtained in a non-video manner and form a corresponding traffic condition parameter.

In implementations, the traffic condition prediction unit 402 includes a traffic control parameter extraction subunit 406.

The traffic control parameter extraction subunit 406 is configured to analyze and extract a traffic control parameter based on the received traffic condition parameters. The traffic condition prediction unit 402 predicts a traffic condition in a future period of time based on the traffic condition parameters, wherein the traffic condition parameters use the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, the actual traffic condition assessment unit 403 includes a traffic evaluation parameter extraction subunit 407.

The traffic evaluation parameter extraction subunit 407 is configured to analyze and extract a traffic evaluation parameter based on the received traffic condition parameters. The actual traffic condition assessment unit 403 assesses the actual traffic condition using the traffic evaluation parameter based on the traffic condition parameter and according to the traffic condition evaluation model.

In implementations, the traffic evaluation parameter includes at least one of the following parameters: a motor vehicle queuing length, a motor vehicle passing capacity, a motor vehicle delay, a pedestrian and/or non-motor vehicle passing capacity, and a pedestrian and/or non-motor vehicle queuing length.

In implementations, the traffic control decision unit 404 includes:

a prediction value acquisition subunit 408 configured to obtain prediction values of traffic flows of one or more road sections in the road network and prediction values of road traffic at intersections of the one or more road sections according to the traffic condition prediction result;

a traffic signal acquisition subunit 409 configured to acquire a signal cycle and a signal green time of traffic signals at the intersections of the one or more road sections in the road network; and a timing optimization subunit 410 configured to perform timing optimization on the traffic signals at the intersections of the one or more road sections in the road network.

In implementations, the traffic flows of the one or more road sections in the road network include the numbers of vehicles, pedestrians and/or non-motor vehicles arriving at a section of a road in unit time.

In implementations, the road traffic at the intersections includes at least the following parameters: a queuing length, a motor vehicle saturation rate, a motor vehicle arrival rate, an intersection pedestrian flow, and an effective red-light time.

In implementations, the controllable traffic element includes at least one of the following:

traffic light timing, increase/decrease of traffic lights, increase or decrease of left-turn lanes, increase or decrease of U-turn lanes, increase or decrease of right-turn lanes, increase or decrease of straight lanes, setting of one-way streets, adjustment to the numbers of outgoing lanes and incoming lanes, increase/decrease of traffic lights, adjustment to the numbers of left-turn lanes, straight lanes, and/or right-turn lanes, and setting of one-way streets.

In implementations, the optimization algorithm includes a linear planning method. The timing optimization subunit adopts the linear planning method, and parameters involved in a constraint condition thereof include: a signal cycle, a queuing length, a maximum allowable delay time for pedestrians, and a maximum allowable delay time for motor vehicles; and an optimization objective thereof at least includes minimizing the sum of a delay time for pedestrians or non-motor vehicles and a delay time for motor vehicles.

In implementations, the optimization objective includes a difference between motor vehicle flows of the one or more road sections in the road network being less than a preset flow threshold.

In implementations, a linear objective function used in the linear planning method is the total delay time in a road flow direction of each road section being equal to the sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to the sum of delay times for motor vehicles on all branches leading to the road flow direction; and the delay time for motor vehicles on branches is equal to the product of an average vehicle delay time for the motor vehicles on branches and an instantaneous vehicle flow in the direction;

the delay time for pedestrians at all non-crossroad street crossings in the road flow direction is equal to the product of the sum of instantaneous flows of all street crossings in the flow direction of the road section and an average crossing delay time for pedestrians at non-crossroads;

the crossing delay time for pedestrians at all crossroads is equal to the product of the sum of pedestrian crossing flows at crossroads of all branches in the road flow direction and an average delay time for pedestrians at the crossroads; and the control scheme is determined by calculating a minimum value of the linear objective function.

In implementations, determining the control scheme by calculating the minimum value of the linear objective function includes:

calculating the total delay time for all vehicles in the signal cycle; and calculating an average delay time for each vehicle in the signal cycle according to the number of vehicles arriving in the signal cycle.

In implementations, determining the control scheme by calculating the minimum value of the linear objective function includes:

selecting a probability density function according to negative exponential distribution met by a time interval between arrivals of motor vehicles at areas where motor vehicles conflict with pedestrians; and calculating an average pedestrian delay time according to the negative exponential distribution and the probability density function.

In implementations, the total delay time is equal to the sum of the following three parts:

a delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and an average delay time for each motor vehicle on the respective branch is equal to a sum of an average signal delay time of the respective branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to the minimum value of the total delay time.

A reference range of the pedestrians includes non-motor vehicles.

In implementations, a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

In implementations, the traffic condition assessment result includes a balance degree between traffic flows of the one or more road sections in the road network, congested road sections in the road network, and the number of the congested road sections.

In implementations, the control scheme for a controllable traffic element includes at least one of the following road traffic optimization manners:

increasing/decreasing traffic lights, adjusting the numbers of left-turn lanes, straight lanes and/or right-turn lanes, setting one-way streets, and generating road planning suggestions and/or road expansion and optimization suggestions.

The present disclosure further provides an embodiment of a second road traffic control method as follows.

A first road traffic control method is provided in the foregoing embodiment. In addition, the present disclosure further provides a second road traffic control method. Description is given hereinafter with reference to the accompanying drawing.

Figure 5:
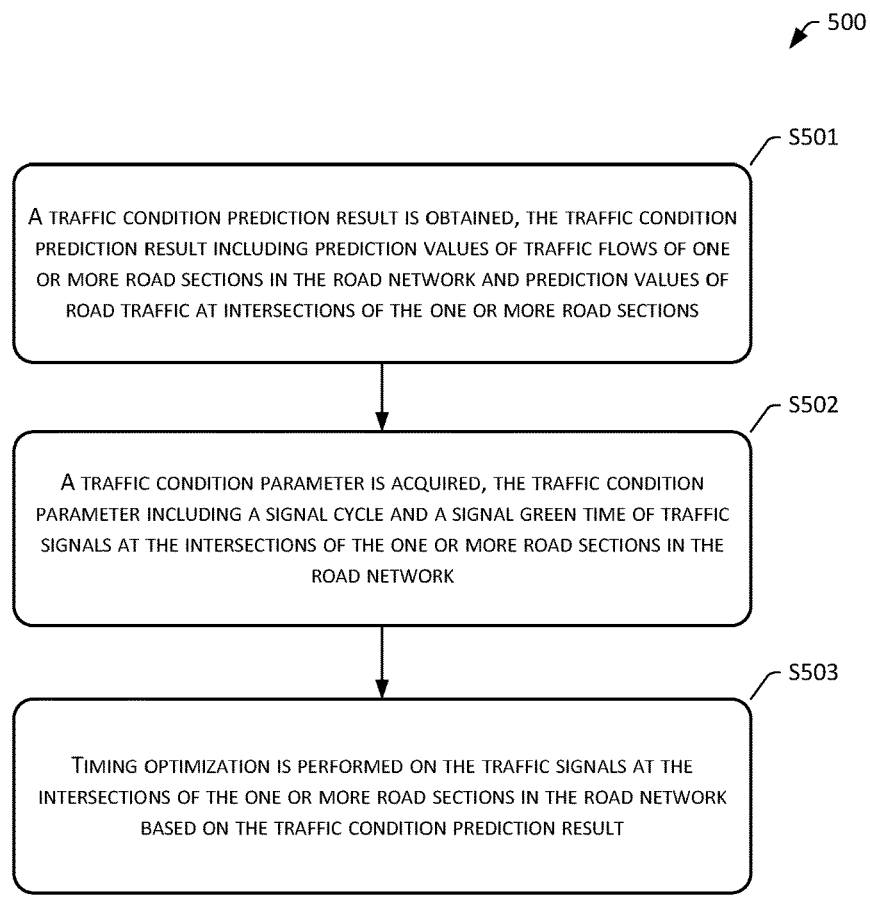
FIG. 5 is a flowchart of a process of a second road traffic control method according to an embodiment of the present disclosure.

Referring to FIG. 5, a flowchart of a process of a second road traffic control method 500 according to the present disclosure is shown.

As the second road traffic control method is based on the first road traffic control method, a description thereof is relatively simple due to their embodiments being basically similar. Reference can be made to the corresponding description about the embodiment provided above for related parts. The embodiment of the second road traffic control method described below is merely illustrative.

The present disclosure provides a second road traffic control method 500, including the following operations.

Operation S501: A traffic condition prediction result is obtained, the traffic condition prediction result including prediction values of traffic flows of one or more road sections in the road network and prediction values of road traffic at intersections of the one or more road sections.

Operation S502: A traffic condition parameter is acquired, the traffic condition parameter including a signal cycle and a signal green time of traffic signals at the intersections of the one or more road sections in the road network.

Operation S503: Timing optimization is performed on the traffic signals at the intersections of the one or more road sections in the road network based on the traffic condition prediction result.

In implementations, a timing optimization scheme is determined using a linear planning method. If the timing optimization scheme is determined using a linear planning method, parameters involved in a constraint condition thereof include a signal cycle, a queuing length, a maximum allowable delay time for pedestrians, and a maximum allowable delay time for motor vehicles. An optimization objective thereof at least includes minimizing a sum of a delay time for pedestrians or non-motor vehicles and a delay time for motor vehicles.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to a product of an average vehicle delay time for the motor vehicles on branches and an instantaneous vehicle flow in the direction;

the delay time for pedestrians at all non-crossroad street crossings in the road flow direction is equal to a product of the sum of instantaneous flows of all street crossings in the flow direction on the road section and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the timing optimization scheme is determined by calculating the minimum value of the linear objective function.

In implementations, determining the timing optimization scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, the road traffic control method includes acquiring traffic condition information obtained in a non-video manner, and forming a corresponding traffic condition parameter.

In implementations, obtaining the traffic condition prediction result includes predicting a traffic condition in a future period of time according to the traffic condition parameter to obtain a traffic condition prediction result, which includes the following sub-operation:

analyzing and extracting a traffic control parameter according to the received traffic condition parameters, the traffic condition in the future period of time being predicted according to the traffic condition parameters when predicting the traffic condition in the future period of time according to the traffic condition parameter to obtain the traffic condition prediction result, wherein the traffic condition parameters use the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, the traffic flows of the one or more road sections in the road network include:

the numbers of vehicles, pedestrians and/or non-motor vehicles arriving at a section of a road in unit time.

In implementations, the road traffic at the intersections at least includes the following parameters:

a queuing length, a motor vehicle saturation rate, a motor vehicle arrival rate, an intersection pedestrian flow, and an effective red-light time.

In implementations, the optimization objective of the road traffic control method includes:

a difference between motor vehicle flows of the one or more road sections in the road network being less than a preset flow threshold.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, the total delay time is equal to a sum of the following three parts:

a delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and an average delay time for each motor vehicle on the respective branch is equal to a sum of an average signal delay time of the respective branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to a minimum value of the total delay time.

In implementations, the timing optimization scheme includes at least one of the following road traffic optimization manners:

adjusting traffic light timing, increasing/decreasing traffic lights, adjusting the numbers of left-turn lanes, straight lanes and/or right-turn lanes, setting one-way streets, and generating road planning suggestions and/or road expansion and optimization suggestions.

The present disclosure further provides an embodiment of a second road traffic control system as follows.

A second road traffic control method is provided in the foregoing embodiment. In addition, the present disclosure further provides a second road traffic control system. Description is given below with reference to the accompanying drawing.

Figure 6:
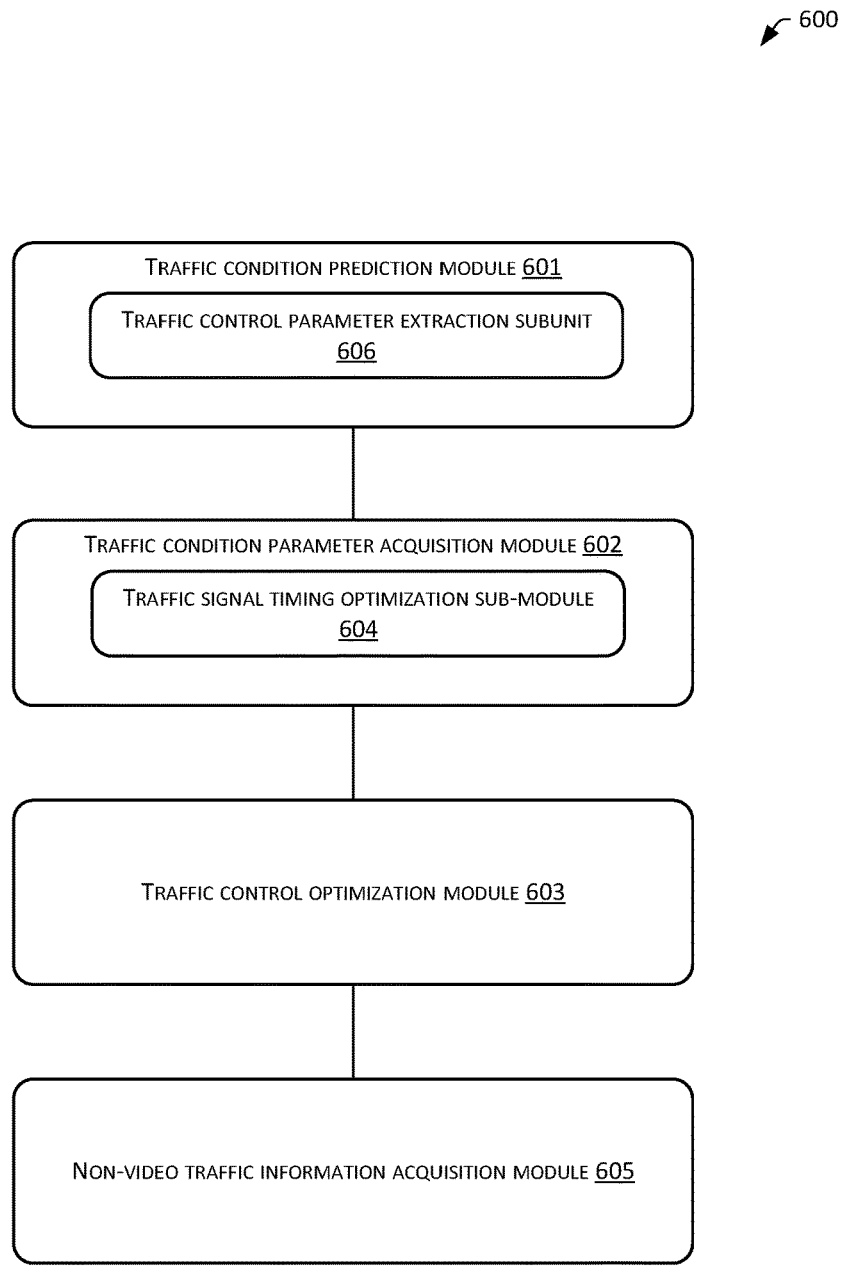
FIG. 6 is a schematic diagram of a second road traffic control system according to an embodiment of the present disclosure.

Referring to FIG. 6, a schematic diagram of a second road traffic control system 600 according to the present disclosure is shown.

As the second road traffic control system is based on the second road traffic control method, the second road traffic control system is described in a simple manner due to their embodiments being basically similar. Reference can be made to the corresponding description about the embodiment provided above for related parts. The embodiment of the second road traffic control system described below is merely illustrative.

The present disclosure provides a second road traffic control system 600, including:

a traffic condition prediction module 601 configured to obtain a traffic condition prediction result, the traffic condition prediction result including prediction values of traffic flows of one or more road sections in the road network and prediction values of road traffic at intersections of the one or more road sections;

a traffic condition parameter acquisition module 602 configured to acquire traffic condition parameters, the traffic condition parameters including a signal cycle and a signal green time of traffic signals at the intersections of the one or more road sections in the road network; and a traffic control optimization module 603 configured to perform timing optimization on the traffic signals at the intersections of the one or more road sections in the road network based on the traffic condition prediction result.

In implementations, the traffic control optimization module 603 includes a traffic signal timing optimization submodule 604 configured to determine the timing optimization scheme using a linear planning method. When the timing optimization scheme is determined using a linear planning method, parameters involved in a constraint condition thereof include a signal cycle, a queuing length, a maximum allowable delay time for pedestrians, and a maximum allowable delay time for motor vehicles, and an optimization objective thereof at least includes minimizing a sum of a delay time for pedestrians or non-motor vehicles and a delay time for motor vehicles.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to a product of an average vehicle delay time for the motor vehicles on branches and an instantaneous vehicle flow in the direction;

the delay time for pedestrians at all non-crossroad street crossings in the road flow direction is equal to a product of a sum of instantaneous flows of all street crossings in the flow direction on the road section and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the timing optimization scheme is determined by calculating a minimum value of the linear objective function.

In implementations, determining the timing optimization scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, the road traffic control system 600 includes:

a non-video traffic information acquisition module 605 configured to acquire traffic condition information obtained in a non-video manner and form a corresponding traffic condition parameter.

In implementations, the traffic condition prediction module 601 includes a traffic control parameter extraction subunit 606.

The traffic control parameter extraction subunit 606 is configured to analyze and extract a traffic control parameter according to the received traffic condition parameter. The traffic condition prediction module 602 predicts a traffic condition in a future period of time according to the traffic condition parameter, wherein the traffic condition parameter is the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, the traffic flows of the one or more road sections in the road network include:

the numbers of vehicles, pedestrians and/or non-motor vehicles arriving at a section of a road in unit time.

In implementations, the road traffic at the intersections at least includes the following parameters:

a queuing length, a motor vehicle saturation rate, a motor vehicle arrival rate, an intersection pedestrian flow, and an effective red-light time.

In implementations, the optimization objective of the timing optimization scheme includes:

a difference between motor vehicle flows of the one or more road sections in the road network being less than a preset flow threshold.

In implementations, determining the timing optimization scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, the total delay time of the timing optimization scheme is equal to a sum of the following three parts:

a delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and the average delay time for each motor vehicle on the respective branch is equal to a sum of an average signal delay time of the respective branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to a minimum value of the total delay time.

In implementations, the timing optimization scheme includes at least one of the following road traffic optimization manners:

adjusting traffic light timing, increasing/decreasing traffic lights, adjusting the numbers of left-turn lanes, straight lanes and/or right-turn lanes, setting one-way streets, and generating road planning suggestions and/or road expansion and optimization suggestions.

An embodiment of an electronic device provided in the present disclosure is as follows.

The present disclosure further provides an electronic device configured to implement the first road traffic control method, which is described below with reference to the accompanying drawing.

Figure 7:
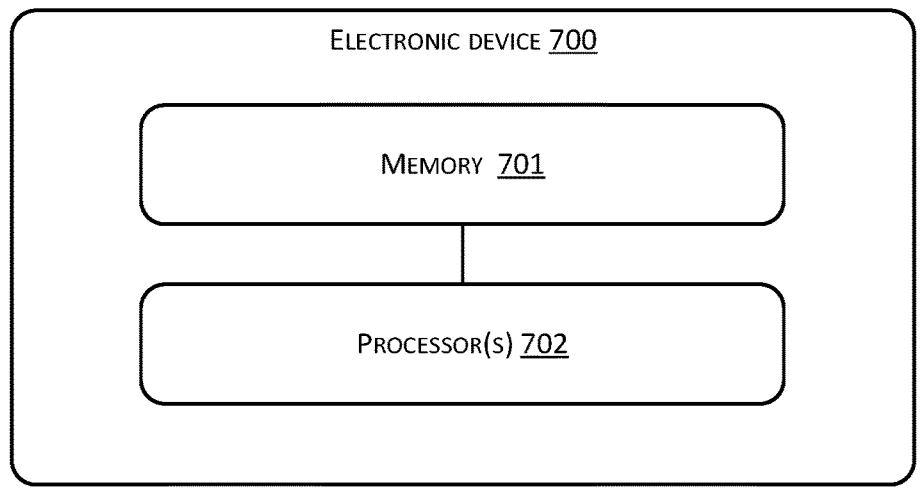
FIG. 7 is a schematic diagram of a first electronic device according to an embodiment of the present disclosure.

Referring to FIG. 7, a schematic diagram of a first electronic device 700 according to this embodiment is shown.

The electronic device embodiment provided in the present disclosure is described simply. Reference can be made to the corresponding description about the embodiment of the road traffic control method provided above for the related part. The embodiment described below is merely schematic.

The present disclosure provides an electronic device 700, including:

memory 701, and processor(s) 702;

the memory 701 being configured to store computer executable instructions, and the processor(s) 702 being configured to execute the computer executable instructions:

acquiring traffic condition parameters of a road network from video traffic information, the traffic condition parameters including at least a motor vehicle traffic condition parameter, and including at least one of a pedestrian traffic condition parameter and a non-motor vehicle traffic condition parameter;

predicting a traffic condition in a future period of time according to the traffic condition parameter to obtain a traffic condition prediction result;

assessing an actual traffic condition according to a traffic condition evaluation model based on the traffic condition parameter to obtain an actual traffic condition assessment result; and determining a control scheme for a controllable traffic element using an optimization algorithm according to the traffic condition prediction result and the actual traffic condition assessment result.

In implementations, the processor(s) 702 is/are further configured to execute the following computer executable instructions: acquiring traffic condition information obtained in a non-video manner, and forming a corresponding traffic condition parameter.

In implementations, predicting the traffic condition in the future period of time according to the traffic condition parameter to obtain the traffic condition prediction result includes:

analyzing and extracting a traffic control parameter according to the received traffic condition parameter; wherein during execution of the computer executable instructions of predicting the traffic condition in the future period of time according to the traffic condition parameter to obtain the traffic condition prediction result, the traffic condition parameter is the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, assessing the actual traffic condition according to the traffic condition evaluation model based on the traffic condition parameter to obtain the actual traffic condition assessment result includes:

analyzing and extracting a traffic evaluation parameter according to the received traffic condition parameters, wherein during execution of the computer executable instructions of assessing the actual traffic condition according to the traffic condition evaluation model based on the traffic condition parameter to obtain the actual traffic condition assessment result, the traffic condition parameter is the traffic evaluation parameter.

In implementations, the traffic evaluation parameter includes at least one of the following parameters: a motor vehicle queuing length, a motor vehicle passing capacity, a motor vehicle delay, a pedestrian and/or non-motor vehicle passing capacity, and a pedestrian and/or non-motor vehicle queuing length.

In implementations, determining the control scheme for the controllable traffic element using the optimization algorithm according to the traffic condition prediction result and the actual traffic condition assessment result is implemented in the following manner:

obtaining prediction values of traffic flows of one or more road sections in the road network and prediction values of road traffic at intersections of the one or more road sections according to the traffic condition prediction result;

acquiring a signal cycle and a signal green time of traffic signals at the intersections of the one or more road sections in the road network; and performing timing optimization on the traffic signals at the intersections of the one or more road sections in the road network.

In implementations, the traffic flows of the one or more road sections in the road network include: the numbers of vehicles, pedestrians and/or non-motor vehicles arriving at a section of a road in unit time.

In implementations, the road traffic at the intersections includes at least the following parameters: a queuing length, a motor vehicle saturation rate, a motor vehicle arrival rate, an intersection pedestrian flow, and an effective red-light time.

In implementations, the optimization algorithm includes a linear planning method. The timing optimization on the signals at the intersections of the one or more road sections in the road network is performed using the linear planning method, and parameters involved in a constraint condition thereof include a signal cycle, a queuing length, a maximum allowable delay time for pedestrians, and a maximum allowable delay time for motor vehicles, and an optimization objective thereof at least includes minimizing a sum of a delay time for pedestrians or non-motor vehicles and a delay time for motor vehicles.

In implementations, the optimization objective includes a difference between motor vehicle flows of the one or more road sections in the road network being less than a preset flow threshold.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to the sum of delay times for motor vehicles on all branches leading to the road flow direction; and the delay time for motor vehicles on branches is equal to the product of an average vehicle delay time for the motor vehicles on branches and an instantaneous vehicle flow in the direction;

the delay time for pedestrians at all non-crossroad street crossings in the road flow direction is equal to the product of the sum of instantaneous flows of all street crossings in the flow direction of the road section and an average crossing delay time for pedestrians at non-crossroads;

the crossing delay time for pedestrians at all crossroads is equal to the product of the sum of pedestrian crossing flows at crossroads of all branches in the road flow direction and an average delay time for pedestrians at the crossroads; and the control scheme is determined by calculating a minimum value of the linear objective function.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, determining the control scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, the total delay time is equal to a sum of the following three parts:

a delay time for motor vehicles in the road flow direction being equal to a sum of vehicle delay times for motor vehicles on all branches, wherein the vehicle delay time for motor vehicles on each branch is equal to the product of an average delay time for each motor vehicle on the branch and an instantaneous vehicle flow of the branch in the road flow direction; and the average delay time for each motor vehicle on the branch is equal to the sum of an average signal delay time of the branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein the signal delay time of each street crossing is equal to a signal delay time of the street crossing multiplied by an instantaneous pedestrian flow of the street crossing; and a crossing delay time for all pedestrians at the crossroad being equal to the product of a pedestrian flow at the crossroad and an average pedestrian delay time at the crossroad, wherein the average pedestrian delay time at the crossroad is equal to the sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to the minimum value of the total delay time.

A reference range of the pedestrians includes non-motor vehicles.

In implementations, a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

In implementations, the traffic condition assessment result includes a balance degree between traffic flows of the one or more road sections in the road network, congested road sections in the road network, and the number of the congested road sections.

In implementations, the control scheme for a controllable traffic element includes at least one of the following road traffic optimization manners:

increasing/decreasing traffic lights, adjusting the numbers of left-turn lanes, straight lanes and/or right-turn lanes, setting one-way streets, and generating road planning suggestions and/or road expansion and optimization suggestions.

The present disclosure further provides an embodiment of a second electronic device as follows.

The present disclosure further provides a second electronic device configured to implement the second road traffic control method, which is described below with reference to the accompanying drawing.

Figure 8:
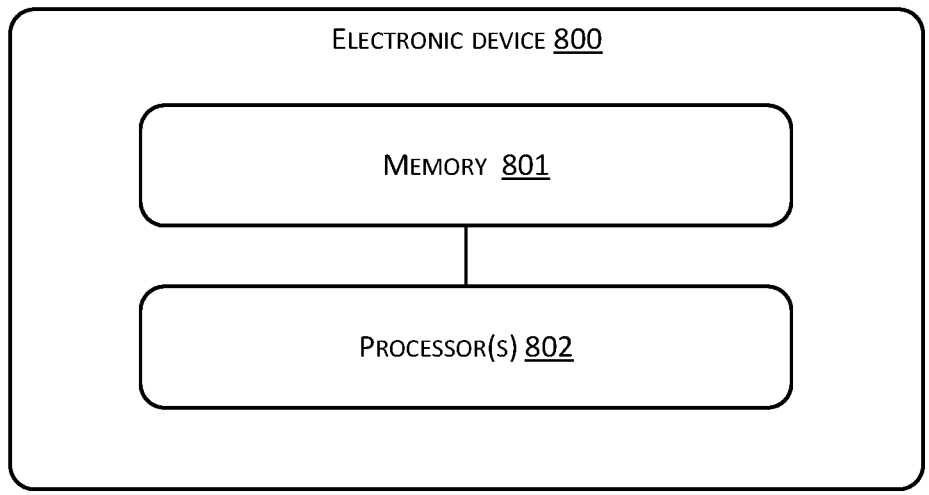
FIG. 8 is a schematic diagram of a second electronic device according to an embodiment of the present disclosure.

Referring to FIG. 8, a schematic diagram of a second electronic device 800 according to this embodiment is shown.

The electronic device embodiment provided in the present disclosure is described in a relatively simple manner. Reference can be made to the corresponding description about the embodiment of the second road traffic control method provided above for related parts. The embodiment described below is merely illustrative.

The present disclosure provides a second electronic device 800, including:

memory 801, and processor(s) 802;

the memory 801 being configured to store computer executable instructions, and the processor(s) 802 being configured to execute the computer executable instructions:

acquiring a traffic condition parameter, the traffic condition parameter including a signal cycle and a signal green time of traffic signals at the intersections of the one or more road sections in the road network; and performing timing optimization on the traffic signals at the intersections of the one or more road sections in the road network based on the traffic condition prediction result.

In implementations, a scheme of the timing optimization is determined using a linear planning method. When the scheme of the timing optimization is determined using the linear planning method, parameters involved in a constraint condition thereof include a signal cycle, a queuing length, a maximum allowable delay time for pedestrians, and a maximum allowable delay time for motor vehicles, and an optimization objective thereof includes at least minimizing the sum of a delay time for pedestrians or non-motor vehicles and a delay time for motor vehicles.

In implementations, a linear objective function used in the linear planning method is a total delay time in a road flow direction of each road section being equal to the a of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to the product of an average vehicle delay time for the motor vehicles on branches and an instantaneous vehicle flow in the direction;

the delay time for pedestrians at all non-crossroad street crossings in the road flow direction is equal to a product of a sum of instantaneous flows of all street crossings in the flow direction of the road section and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the timing optimization scheme is determined by calculating a minimum value of the linear objective function.

In implementations, determining the timing optimization scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, traffic condition information obtained in a non-video manner is acquired, and a corresponding traffic condition parameter is formed.

In implementations, predicting the traffic condition in the future period of time according to the traffic condition parameter to obtain the traffic condition prediction result includes the following sub-operation:

analyzing and extracting a traffic control parameter according to the received traffic condition parameter; the traffic condition in the future period of time being predicted according to the traffic condition parameter when predicting the traffic condition in the future period of time according to the traffic condition parameter to obtain the traffic condition prediction result, wherein the traffic condition parameter is the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, the traffic flows of the one or more road sections in the road network include:

the numbers of vehicles, pedestrians and/or non-motor vehicles arriving at a section of a road in unit time.

In implementations, the road traffic at the intersections includes at least the following parameters:

a queuing length, a motor vehicle saturation rate, a motor vehicle arrival rate, an intersection pedestrian flow, and an effective red-light time.

In implementations, the optimization objective of the road traffic control method includes:

a difference between motor vehicle flows of the one or more road sections in the road network being less than a preset flow threshold.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, the total delay time is equal to a sum of the following three parts:

a delay time for motor vehicles in the road flow direction being equal to a sum of vehicle delay times for motor vehicles on all branches, wherein the vehicle delay time for motor vehicles on each branch is equal to the product of an average delay time for each motor vehicle on the branch and an instantaneous vehicle flow of the branch in the road flow direction; and the average delay time for each motor vehicle on the branch is equal to the sum of an average signal delay time of the branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein the signal delay time of each street crossing is equal to a signal delay time of the street crossing multiplied by an instantaneous pedestrian flow of the street crossing; and a crossing delay time for all pedestrians at the crossroad being equal to a product of a pedestrian flow at the crossroad and an average pedestrian delay time at the crossroad, wherein the average pedestrian delay time at the crossroad is equal to the sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to the minimum value of the total delay time.

In implementations, the timing optimization scheme includes at least one of the following road traffic optimization manners:

adjusting traffic light timing, increasing/decreasing traffic lights, adjusting the numbers of left-turn lanes, straight lanes and/or right-turn lanes, setting one-way streets, and generating road planning suggestions and/or road expansion and optimization suggestions.

An embodiment of a computer readable media provided in the present disclosure is as follows.

A road traffic control method is provided in the foregoing embodiment. In addition, the present disclosure further provides a computer readable media with instructions stored thereon, wherein the road traffic control method provided in the present disclosure is performed when the instructions are executed.

The present disclosure provides a computer readable media, wherein instructions are stored on the computer readable media, and the instructions, when executed by one or more processors, cause the one or more processors to perform acts including:

acquiring traffic condition parameters of a road network from video traffic information, the traffic condition parameters including at least a motor vehicle traffic condition parameter, and including at least one of a pedestrian traffic condition parameter and a non-motor vehicle traffic condition parameter;

predicting a traffic condition in a future period of time according to the traffic condition parameters to obtain a traffic condition prediction result;

assessing an actual traffic condition according to a traffic condition evaluation model based on the traffic condition parameter to obtain an actual traffic condition assessment result; and determining a control scheme for a controllable traffic element using an optimization algorithm according to the traffic condition prediction result and the actual traffic condition assessment result.

In implementations, the acts further include acquiring traffic condition information obtained in a non-video manner, and forming a corresponding traffic condition parameter.

In implementations, predicting the traffic condition in the future period of time according to the traffic condition parameters to obtain the traffic condition prediction result includes:

analyzing and extracting a traffic control parameter according to the received traffic condition parameters; and the traffic condition prediction module predicts the traffic condition in the future period of time according to the traffic condition parameters, wherein the traffic condition parameters use the traffic control parameter.

In implementations, the traffic control parameter includes at least one of the following parameters:

a motor vehicle flow, a motor vehicle speed, a motor vehicle queuing length, a pedestrian and/or non-motor vehicle flow, and a pedestrian and/or non-motor vehicle speed.

In implementations, assessing the actual traffic condition according to the traffic condition evaluation model based on the traffic condition parameter to obtain the actual traffic condition assessment result includes:

analyzing and extracting a traffic evaluation parameter according to the received traffic condition parameters, the actual traffic condition assessment module assessing the actual traffic condition by using the traffic evaluation parameter based on the traffic condition parameters and according to the traffic condition evaluation model.

In implementations, the traffic evaluation parameter includes at least one of the following parameters:

a motor vehicle queuing length, a motor vehicle passing capacity, a motor vehicle delay, a pedestrian and/or non-motor vehicle passing capacity, and a pedestrian and/or non-motor vehicle queuing length.

In implementations, the controllable traffic element includes at least one of the following:

traffic light timing, increase/decrease of traffic lights, increase or decrease of left-turn lanes, increase or decrease of U-turn lanes, increase or decrease of right-turn lanes, increase or decrease of straight lanes, setting of one-way streets, adjustment to the numbers of outgoing lanes and incoming lanes, increase/decrease of traffic lights, adjustment to the numbers of left-turn lanes, straight lanes, and/or right-turn lanes, and setting of one-way streets.

In implementations, determining the control scheme for the controllable traffic element using the optimization algorithm according to the traffic condition prediction result and the actual traffic condition assessment result is implemented in the following manner:

obtaining prediction values of traffic flows of one or more road sections in the road network and prediction values of road traffic at intersections of the one or more road sections according to the traffic condition prediction result;

acquiring a signal cycle and a signal green time of traffic signals at the intersections of the one or more road sections in the road network; and performing timing optimization on the traffic signals at the intersections of the one or more road sections in the road network.

In implementations, the traffic flows of the one or more road sections in the road network include: the numbers of vehicles, pedestrians and/or non-motor vehicles arriving at a section of a road in unit time.

In implementations, the road traffic at the intersections at least includes the following parameters: a queuing length, a motor vehicle saturation rate, a motor vehicle arrival rate, an intersection pedestrian flow, and an effective red-light time.

In implementations, the optimization algorithm includes a linear planning method. The timing optimization on the signals at the intersections of the one or more road sections in the road network is performed using the linear planning method, parameters involved in a constraint condition thereof include a signal cycle, a queuing length, a maximum allowable delay time for pedestrians, and a maximum allowable delay time for motor vehicles, and an optimization objective thereof at least includes minimizing a sum of a delay time for pedestrians or non-motor vehicles and a delay time for motor vehicles.

In implementations, the optimization objective includes a difference between motor vehicle flows of the one or more road sections in the road network being less than a preset flow threshold.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to the sum of delay times for motor vehicles on all branches leading to the road flow direction; and the delay time for motor vehicles on branches is equal to the product of an average vehicle delay time for the motor vehicles on branches and an instantaneous vehicle flow in the direction;

the delay time for pedestrians at all non-crossroad street crossings in the road flow direction is equal to the product of the sum of instantaneous flows of all street crossings in the road flow direction and an average crossing delay time for pedestrians at non-crossroads;

the crossing delay time for pedestrians at all crossroads is equal to the product of the sum of pedestrian crossing flows at crossroads of all branches in the road flow direction and an average delay time for pedestrians at the crossroads; and the control scheme is determined by calculating the minimum value of the linear objective function.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, determining the control scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, the total delay time is equal to a sum of the following three parts:

a delay time for motor vehicles in the road flow direction being equal to a sum of vehicle delay times for motor vehicles on all branches, wherein the vehicle delay time for motor vehicles on each branch is equal to a product of an average delay time for each motor vehicle on the branch and an instantaneous vehicle flow of the branch in the road flow direction; and the average delay time for each motor vehicle on the branch is equal to a sum of an average signal delay time of the branch in the road flow direction and an average motor vehicle delay time caused by a conflicting area between motor vehicles and pedestrians;

a delay time for pedestrians at all non-crossroad street crossings in the road flow direction being equal to a sum of signal delay times of the street crossings, wherein the signal delay time of each street crossing is equal to a signal delay time of the street crossing multiplied by an instantaneous pedestrian flow of the street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to a minimum value of the total delay time.

In implementations, a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

In implementations, the traffic condition assessment result includes a balance degree between traffic flows of the one or more road sections in the road network, congested road sections in the road network, the number of the congested road sections.

In implementations, the control scheme for a controllable traffic element includes at least one of the following road traffic optimization manners:

increasing/decreasing traffic lights, adjusting the numbers of left-turn lanes, straight lanes and/or right-turn lanes, setting one-way streets, and generating road planning suggestions and/or road expansion and optimization suggestions.

An embodiment of another computer readable media provided in the present disclosure is as follows.

Another road traffic control method is provided in the foregoing embodiment. In addition, the present disclosure further provides a computer readable media, with instructions stored thereon, wherein the other road traffic control method provided in the present disclosure is performed when the instructions are executed.

The present disclosure provides another computer readable media, wherein instructions are stored on the computer readable media, and the instructions, when executed by one or more processors, cause the one or more processors to perform acts including:

obtaining a traffic condition prediction result, the traffic condition prediction result including prediction values of traffic flows of one or more road sections in the road network and prediction values of road traffic at intersections of the one or more road sections;

acquiring traffic condition parameters, the traffic condition parameters including a signal cycle and a signal green time of traffic signals at the intersections of the one or more road sections in the road network; and performing timing optimization on the traffic signals at the intersections of the one or more road sections in the road network based on the traffic condition prediction result.

In implementations, a scheme of the timing optimization is determined using a linear planning method. When the timing optimization scheme is determined using the linear planning method, parameters involved in a constraint condition thereof include a signal cycle, a queuing length, a maximum allowable delay time for pedestrians, and a maximum allowable delay time for motor vehicles, and an optimization objective thereof includes at least minimizing a sum of a delay time for pedestrians or non-motor vehicles and a delay time for motor vehicles.

In implementations, a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads;

wherein the delay time for motor vehicles in the road flow direction is equal to a sum of delay times for motor vehicles on all branches leading to the road flow direction; and the delay time for motor vehicles on branches is equal to the product of an average vehicle delay time for the motor vehicles on branches and an instantaneous vehicle flow in the direction;

the delay time for pedestrians at all non-crossroad street crossings in the road flow direction is equal to a product of a sum of instantaneous flows of all street crossings in the road flow direction and an average crossing delay time for pedestrians at non-crossroads;

the crossing delay time for pedestrians at all crossroads is equal to a product of a sum of pedestrian crossing flows at crossroads of all branches in the road flow direction and an average delay time for pedestrians at the crossroads; and the timing optimization scheme is determined by calculating the minimum value of the linear objective function.

In implementations, determining the timing optimization scheme by calculating the minimum value of the linear objective function includes:

selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

In implementations, the road traffic control method includes acquiring traffic condition information obtained in a non-video manner, and forming a corresponding traffic condition parameter.

In implementations, obtaining the traffic condition prediction result includes predicting a traffic condition in a future period of time according to the traffic condition parameters to obtain a traffic condition prediction result, which includes the following sub-operation:

analyzing and extracting a traffic control parameter according to the received traffic condition parameters; the traffic condition in the future period of time being predicted according to the traffic condition parameter when predicting the traffic condition in the future period of time according to the traffic condition parameters to obtain the traffic condition prediction result, wherein the traffic condition parameters use the traffic control parameter.

In implementations, the traffic control parameter includes at least one of the following parameters: a motor vehicle flow, a motor vehicle speed, a motor vehicle queuing length, a pedestrian and/or non-motor vehicle flow, and a pedestrian and/or non-motor vehicle speed.

In implementations, the traffic flows of the one or more road sections in the road network include: the numbers of vehicles, pedestrians and/or non-motor vehicles arriving at a section of a road in unit time.

In implementations, the road traffic at the intersections includes at least the following parameters: a queuing length, a motor vehicle saturation rate, a motor vehicle arrival rate, an intersection pedestrian flow, and an effective red-light time.

In implementations, the optimization objective of the road traffic control method includes a difference between motor vehicle flows of the one or more road sections in the road network being less than a preset flow threshold.

In implementations, determining the control scheme by calculating the minimum value of the linear objective function includes:

calculating a total delay time for all vehicles in the signal cycle; and calculating an average delay time for each vehicle in the signal cycle according to the number of vehicles arriving in the signal cycle.

In implementations, the total delay time is equal to a sum of the following three parts:

a delay time for motor vehicles in the road flow direction being equal to a sum of vehicle delay times for motor vehicles on all branches, wherein the vehicle delay time for motor vehicles on each branch is equal to the product of an average delay time for each motor vehicle on the branch and an instantaneous vehicle flow of the branch in the road flow direction; and the average delay time for each motor vehicle on the branch is equal to the sum of an average signal delay time of the branch in the road flow direction and an average motor vehicle delay time caused by a conflicting area between motor vehicles and pedestrians;

a delay time for pedestrians at all non-crossroad street crossings in the road flow direction being equal to the sum of signal delay times of the street crossings, wherein the signal delay time of each street crossing is equal to a signal delay time of the street crossing multiplied by an instantaneous pedestrian flow of the street crossing; and a crossing delay time for all pedestrians at the crossroad being equal to the product of a pedestrian flow at the crossroad and an average pedestrian delay time at the crossroad, wherein the average pedestrian delay time at the crossroad is equal to the sum of pedestrian delay times caused by conflicting areas between motor vehicles and pedestrians on all branches plus an average signal delay time for each pedestrian at the crossroad;

wherein traffic light timing for pedestrians and non-motor vehicles and traffic light timing for motor vehicles are determined according to a minimum value of the total delay time.

In implementations, the scheme of the timing optimization includes at least one of the following road traffic optimization manners:

adjusting traffic light timing, increasing/decreasing traffic lights, adjusting the numbers of left-turn lanes, straight lanes and/or right-turn lanes, setting one-way streets, and generating road planning suggestions and/or road expansion and optimization suggestions.

Figure 9:
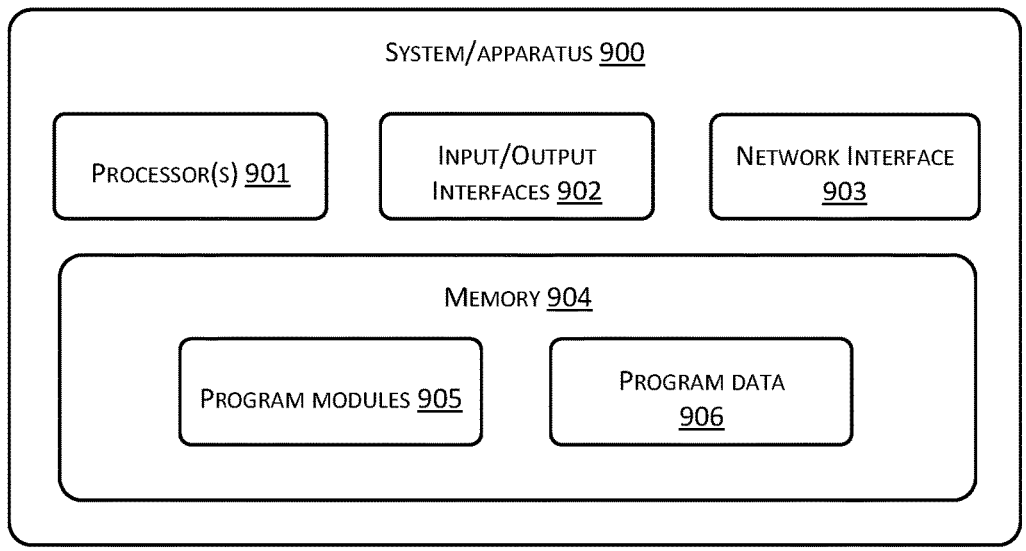
FIG. 9 is a schematic diagram of the system or apparatus described in FIGS. 1, 4 and 6 in more detail.

FIG. 9 shows a schematic diagram of an example system/apparatus 900 as described in FIGS. 1, 4 and 6 in more detail. In a typical configuration, the system/apparatus 900 may include one or more computing devices, or may be a part of one or more computing devices. The one or more computing devices may be located at a single place, or may be distributed among a plurality of network devices through a network, e.g., a cloud. By way of example and not limitation, the system/apparatus 900 may include one or more processors (CPU) 901, an input/output interface 902, a network interface 903, and memory 904.

The memory 904 may include a form of computer readable media such as a volatile memory, a random access memory (RAM) and/or a non-volatile memory, for example, a read-only memory (ROM) or a flash RAM. The memory 904 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 904 may include program modules 905 and program data 906. Depending on which system or apparatus (such as the system or apparatus described in FIGS. 1, 4 and 6) the system/apparatus 900 is representing, the program modules 905 may include one or more of the modules/sub-modules/units/sub-units as described in the foregoing description.

One skilled in the art should understand that the embodiments of the present disclosure may be provided as methods, systems or computer program products. Therefore, the present disclosure may adopt a form of complete hardware embodiments, complete software embodiments, or embodiments of software and hardware combinations. Moreover, the present disclosure may adopt a form of a computer program product implemented on one or more computer useable storage media (including, but not limited to, a magnetic disk memory, a CD-ROM, an optical memory, and so on) containing computer useable program codes.

Although the present disclosure is disclosed above with exemplary embodiments, the exemplary embodiments are not intended to limit the present disclosure. Any person skilled in the art can make possible changes and modifications without departing from the spirit and scope of the present disclosure. Therefore, the scope of protection of the present disclosure should be subject to the scope defined by the claims of the present disclosure.

The present disclosure can be better understood using clauses as follows.

Clause 1: A road traffic control system, comprising: a video traffic information analysis module configured to acquire traffic condition parameters of a road network from video traffic information, the traffic condition parameters comprising at least a motor vehicle traffic condition parameter, and comprising at least one of a pedestrian traffic condition parameter or a non-motor vehicle traffic condition parameter; a traffic condition prediction module configured to predict a traffic condition in a future period of time according to the traffic condition parameters to obtain a traffic condition prediction result; an actual traffic condition assessment module configured to assess an actual traffic condition according to a traffic condition evaluation model based on the traffic condition parameters to obtain an actual traffic condition assessment result; and a traffic control decision module configured to determine a control scheme for a controllable traffic element using an optimization algorithm according to the traffic condition prediction result and the actual traffic condition assessment result.

Clause 2: The road traffic control system of Clause 1, further comprising a non-video traffic information acquisition module configured to acquire traffic condition information obtained in a non-video manner and form a corresponding traffic condition parameter.

Clause 3: The road traffic control system of Clause 2, wherein the traffic condition prediction module comprises a traffic control parameter extraction sub-module, wherein the traffic control parameter extraction sub-module is configured to analyze and extract a traffic control parameter according to the traffic condition parameters, and the traffic condition prediction module predicts the traffic condition in the future period of time according to the traffic condition parameters, wherein the traffic condition parameters use the traffic control parameter.

Clause 4: The road traffic control system of Clause 3, wherein the traffic control parameter comprises at least one of the following parameters: a motor vehicle flow, a motor vehicle speed, a motor vehicle queuing length, a pedestrian and/or non-motor vehicle flow, and a pedestrian and/or non-motor vehicle speed.

Clause 5: The road traffic control system of Clause 2, wherein the actual traffic condition assessment module comprises a traffic evaluation parameter extraction sub-module, wherein the traffic evaluation parameter extraction sub-module is configured to analyze and extract a traffic evaluation parameter according to the traffic condition parameters, and the actual traffic condition assessment module assesses the actual traffic condition using the traffic evaluation parameter according to the traffic condition evaluation model based on the traffic condition parameters.

Clause 6: The road traffic control system of Clause 5, wherein the traffic evaluation parameter comprises at least one of the following parameters: a motor vehicle queuing length, a motor vehicle passing capacity, a motor vehicle delay, a pedestrian and/or non-motor vehicle passing capacity, and a pedestrian and/or non-motor vehicle queuing length.

Clause 7: The road traffic control system of Clause 1, wherein the controllable traffic element comprises at least one of the following: traffic light timing, increase/decrease of traffic lights, increase or decrease of left-turn lanes, increase or decrease of U-turn lanes, increase or decrease of right-turn lanes, increase or decrease of straight lanes, setting of one-way streets, adjustment to the numbers of outgoing lanes and incoming lanes, increase/decrease of traffic lights, adjustment to the numbers of left-turn lanes, straight lanes, and/or right-turn lanes, and setting of one-way streets.

Clause 8: The road traffic control system of Clause 1, wherein determining the control scheme for the controllable traffic element using the optimization algorithm according to the traffic condition prediction result and the actual traffic condition assessment result is implemented by: obtaining prediction values of traffic flows of one or more road sections in the road network and prediction values of road traffic at intersections of the one or more road sections according to the traffic condition prediction result; acquiring a signal cycle and a signal green time of traffic signals at the intersections of the one or more road sections in the road network; and performing timing optimization on the traffic signals at the intersections of the one or more road sections in the road network.

Clause 9: The road traffic control system of Clause 8, wherein the traffic flows of the one or more road sections in the road network comprise the numbers of vehicles, pedestrians and/or non-motor vehicles arriving at a section of a road in unit time.

Clause 10: The road traffic control system of Clause 8, wherein the road traffic at the intersections at least comprises the following parameters: a queuing length, a motor vehicle saturation rate, a motor vehicle arrival rate, an intersection pedestrian flow, and an effective red-light time.

Clause 11: The road traffic control system of Clause 8, wherein the optimization algorithm comprises: a linear planning method, the timing optimization on the signals at the intersections of the one or more road sections in the road network is performed by using the linear planning method, parameters involved in a constraint condition thereof comprising a signal cycle, a queuing length, a maximum allowable delay time for pedestrians, and a maximum allowable delay time for motor vehicles, and an optimization objective thereof comprising at least minimizing a sum of a delay time for pedestrians or non-motor vehicles and a delay time for motor vehicles.

Clause 12: The road traffic control system of Clause 8, wherein the optimization objective comprises a difference between motor vehicle flows of the one or more road sections in the road network being less than a preset flow threshold.

Clause 13: The road traffic control system of Clause 10, wherein a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads, wherein: the delay time for motor vehicles in the road flow direction is equal to a sum of delay times for motor vehicles on all branches leading to the road flow direction, and the delay time for motor vehicles on branches is equal to a product of an average vehicle delay time for the motor vehicles on branches and an instantaneous vehicle flow in the direction, a delay time for pedestrians at all non-crossroad street crossings in the road flow direction is equal to a product of a sum of instantaneous flows of all street crossings in the flow direction of the road section and an average crossing delay time for pedestrians at non-crossroads, a crossing delay time for pedestrians at all crossroads is equal to a product of a sum of pedestrian crossing flows at crossroads of all branches in the road flow direction and an average delay time for pedestrians at the crossroads, and the control scheme is determined by calculating a minimum value of the linear objective function.

Clause 14: The road traffic control system of Clause 13, wherein determining the control scheme by calculating the minimum value of the linear objective function comprises: calculating a total delay time for all vehicles in the signal cycle; and calculating an average delay time for each vehicle in the signal cycle according to a number of vehicles arriving in the signal cycle.

Clause 15: The road traffic control system of Clause 13, wherein determining the control scheme by calculating the minimum value of the linear objective function comprises: selecting a probability density function according to a negative exponential distribution met by time intervals between arrivals of motor vehicles at areas where motor vehicles conflict with pedestrians; and calculating an average pedestrian delay time according to the negative exponential distribution and the probability density function.

Clause 16: The road traffic control system of Clause 15, wherein the total delay time is equal to a sum of the following three parts: a delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and the average delay time for each motor vehicle on the respective branch is equal to a sum of an average signal delay time of the respective branch in the road flow direction and an average motor vehicle delay time caused by a conflicting area between motor vehicles and pedestrians; a delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and a crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad; wherein traffic light timing for pedestrians and non-motor vehicles and traffic light timing for motor vehicles are determined according to a minimum value of the total delay time.

Clause 17: The road traffic control system of Clause 8, wherein a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

Clause 18: The road traffic control system of Clause 8, wherein the traffic condition assessment result comprises: a balance degree between traffic flows of the one or more road sections in the road network, congested road sections in the road network, and a number of the congested road sections.

Clause 19: The road traffic control system of Clause 8, wherein the control scheme for the controllable traffic element comprises at least one of the following road traffic optimization manners: increasing/decreasing traffic lights, adjusting the numbers of left-turn lanes, straight lanes and/or right-turn lanes, setting one-way streets, and generating road planning suggestions and/or road expansion and optimization suggestions.

Clause 20: A road traffic control method comprising: acquiring traffic condition parameters of a road network from video traffic information, the traffic condition parameters comprising at least a motor vehicle traffic condition parameter, and comprising at least one of a pedestrian traffic condition parameter or a non-motor vehicle traffic condition parameter; predicting a traffic condition in a future period of time according to the traffic condition parameters to obtain a traffic condition prediction result; assessing an actual traffic condition according to a traffic condition evaluation model based on the traffic condition parameters to obtain an actual traffic condition assessment result; and determining a control scheme for a controllable traffic element using an optimization algorithm according to the traffic condition prediction result and the actual traffic condition assessment result.

Clause 21: A road traffic control apparatus comprising: a video traffic information analysis unit configured to acquire traffic condition parameters of a road network from video traffic information, the traffic condition parameters comprising at least a motor vehicle traffic condition parameter, and comprising at least one of a pedestrian traffic condition parameter or a non-motor vehicle traffic condition parameter; a traffic condition prediction unit configured to predict a traffic condition in a future period of time according to the traffic condition parameters to obtain a traffic condition prediction result; an actual traffic condition assessment unit configured to assess an actual traffic condition according to a traffic condition evaluation model based on the traffic condition parameters to obtain an actual traffic condition assessment result; and a traffic control decision unit configured to determine a control scheme for a controllable traffic element using an optimization algorithm according to the traffic condition prediction result and the actual traffic condition assessment result.

Clause 22: A road traffic control method comprising: obtaining a traffic condition prediction result, the traffic condition prediction result comprising prediction values of traffic flows of one or more road sections in a road network and prediction values of road traffic at intersections of the road sections; acquiring traffic condition parameters, the traffic condition parameters comprising a signal cycle and a signal green time of traffic signals at the intersections of the one or more road sections in the road network; and performing timing optimization on the traffic signals at the intersections of the one or more road sections in the road network based on the traffic condition prediction result.

Clause 23: The road traffic control method of Clause 22, further comprising: determining a scheme of the timing optimization using a linear planning method, wherein if the scheme of the timing optimization is determined using the linear planning method, parameters involved in a constraint condition thereof comprise a signal cycle, a queuing length, a maximum allowable delay time for pedestrians, and a maximum allowable delay time for motor vehicles, and an optimization objective thereof comprises at least minimizing a sum of a delay time for pedestrians or non-motor vehicles and a delay time for motor vehicles.

Clause 24: The road traffic control method of Clause 23, wherein a linear objective function used in the linear planning method is a total delay time in a road flow direction of each road section being equal to a sum of the following three parts: a delay time for motor vehicles in the road flow direction, a delay time for pedestrians at all non-crossroad street crossings in the road flow direction, and a crossing delay time for pedestrians at all crossroads; wherein the delay time for motor vehicles in the road flow direction is equal to a sum of delay times for motor vehicles on all branches leading to the road flow direction, and a delay time for motor vehicles on a branch is equal to a product of an average vehicle delay time for the motor vehicles on the branch and an instantaneous vehicle flow in the direction, the delay time for pedestrians at all non-crossroad street crossings in the road flow direction is equal to a product of a sum of instantaneous flows of all street crossings in the flow direction of the road section and an average crossing delay time for pedestrians at non-crossroads, the crossing delay time for pedestrians at all crossroads is equal to a product of a sum of pedestrian crossing flows at crossroads of all branches in the road flow direction and an average delay time for pedestrians at the crossroads, and the scheme of the timing optimization is determined by calculating a minimum value of the linear objective function.

Clause 25: The road traffic control method of Clause 25, wherein determining the scheme of the timing optimization by calculating the minimum value of the linear objective function comprises: selecting a probability density function according to a negative exponential distribution met by time intervals between arrivals of motor vehicles at areas where the motor vehicles conflict with pedestrians; and calculating an average pedestrian delay time according to the negative exponential distribution and the probability density function.

Clause 26: A road traffic control system comprising: a traffic condition prediction module configured to obtain a traffic condition prediction result, the traffic condition prediction result comprising prediction values of traffic flows of one or more road sections in a road network and prediction values of road traffic at intersections of the road sections; a traffic condition parameter acquisition module configured to acquire traffic condition parameters, the traffic condition parameters comprising a signal cycle and a signal green time of traffic signals at the intersections of the one or more road sections in the road network; and a traffic control optimization module configured to perform timing optimization on the traffic signals at the intersections of the one or more road sections in the road network based on the traffic condition prediction result.

Clause 27: An electronic device comprising: memory, and a processor; the memory being configured to store computer executable instructions, and the processor being configured to execute the computer executable instructions: acquiring traffic condition parameters of a road network from video traffic information, the traffic condition parameters comprising at least a motor vehicle traffic condition parameter, and comprising at least one of a pedestrian traffic condition parameter or a non-motor vehicle traffic condition parameter; predicting a traffic condition in a future period of time according to the traffic condition parameters to obtain a traffic condition prediction result; assessing an actual traffic condition according to a traffic condition evaluation model based on the traffic condition parameters to obtain an actual traffic condition assessment result; and determining a control scheme for a controllable traffic element using an optimization algorithm according to the traffic condition prediction result and the actual traffic condition assessment result.

Clause 28: An electronic device comprising: memory, and a processor; the memory being configured to store computer executable instructions, and the processor being configured to execute the computer executable instructions: obtaining a traffic condition prediction result, the traffic condition prediction result comprising prediction values of traffic flows of one or more road sections in a road network and prediction values of road traffic at intersections of the road sections; acquiring traffic condition parameters, the traffic condition parameters comprising a signal cycle and a signal green time of traffic signals at the intersections of the one or more road sections in the road network; and performing timing optimization on the traffic signals at the intersections of the one or more road sections in the road network based on the traffic condition prediction result.

Clause 29: A computer readable media, wherein instructions are stored on the computer readable media, and the instructions, when executed, are used to: acquire traffic condition parameters of a road network from video traffic information, the traffic condition parameters comprising at least a motor vehicle traffic condition parameter, and comprising at least one of a pedestrian traffic condition parameter or a non-motor vehicle traffic condition parameter; predict a traffic condition in a future period of time according to the traffic condition parameters to obtain a traffic condition prediction result; assess an actual traffic condition according to a traffic condition evaluation model based on the traffic condition parameters to obtain an actual traffic condition assessment result; and determine a control scheme for a controllable traffic element using an optimization algorithm according to the traffic condition prediction result and the actual traffic condition assessment result.

Clause 30: A computer readable media, wherein instructions are stored on the computer readable media, and the instructions, when executed, are used to: obtain a traffic condition prediction result, the traffic condition prediction result comprising prediction values of traffic flows of one or more road sections in a road network and prediction values of road traffic at intersections of the road sections; acquire traffic condition parameters, the traffic condition parameters comprising a signal cycle and a signal green time of traffic signals at the intersections of the one or more road sections in the road network; and perform timing optimization on the traffic signals at the intersections of the one or more road sections in the road network based on the traffic condition prediction result.

What is claimed is:

1. A road traffic control system comprising:
   one or more processors;
   memory;
   a video traffic information analysis module stored in the memory and executable by the one or more processors to acquire traffic condition parameters of a road network from video traffic information, the traffic condition parameters comprising at least a motor vehicle traffic condition parameter, and comprising at least one of a pedestrian traffic condition parameter or a non-motor vehicle traffic condition parameter;
   a traffic condition prediction module stored in the memory and executable by the one or more processors to predict a traffic condition in a future period of time according to the traffic condition parameters to obtain a traffic condition prediction result;
   an actual traffic condition assessment module stored in the memory and executable by the one or more processors to assess an actual traffic condition according to a traffic condition evaluation model based on the traffic condition parameters to obtain an actual traffic condition assessment result; and
   a traffic control decision module stored in the memory and executable by the one or more processors to determine a control scheme for a controllable traffic element using an optimization algorithm according to the traffic condition prediction result and the actual traffic condition assessment result, an optimization objective of the optimization algorithm including at least minimizing a sum of a delay time for pedestrians or non-motor vehicles and a delay time for motor vehicles.

2. The road traffic control system of claim 1, further comprising a non-video traffic information acquisition module configured to acquire traffic condition information obtained in a non-video manner and form a corresponding traffic condition parameter.

3. The road traffic control system of claim 2, wherein the traffic condition prediction module comprises a traffic control parameter extraction sub-module configured to analyze and extract a traffic control parameter based on the traffic condition parameters, and the traffic condition prediction module predicts the traffic condition in the future period of time according to the traffic condition parameters, wherein the traffic condition parameters use the traffic control parameter.

4. The road traffic control system of claim 3, wherein the traffic control parameter comprises at least one of: a motor vehicle flow, a motor vehicle speed, a motor vehicle queuing length, a pedestrian and/or non-motor vehicle flow, or a pedestrian and/or non-motor vehicle speed.

5. The road traffic control system of claim 2, wherein the actual traffic condition assessment module comprises a traffic evaluation parameter extraction sub-module configured to analyze and extract a traffic evaluation parameter based on the traffic condition parameters, and the actual traffic condition assessment module assesses the actual traffic condition using the traffic evaluation parameter according to the traffic condition evaluation model based on the traffic condition parameters.

6. The road traffic control system of claim 5, wherein the traffic evaluation parameter comprises at least one of: a motor vehicle queuing length, a motor vehicle passing capacity, a motor vehicle delay, a pedestrian and/or non-motor vehicle passing capacity, or a pedestrian and/or non-motor vehicle queuing length.

7. The road traffic control system of claim 1, wherein the controllable traffic element comprises at least one of:
   traffic light timing, increase/decrease of traffic lights, increase or decrease of left-turn lanes, increase or decrease of U-turn lanes, increase or decrease of right-turn lanes, increase or decrease of straight lanes, setting of one-way streets, adjustment to the numbers of outgoing lanes and incoming lanes, increase/decrease of traffic lights, adjustment to the numbers of left-turn lanes, straight lanes, and/or right-turn lanes, and setting of one-way streets.

8. The road traffic control system of claim 1, wherein determining the control scheme for the controllable traffic element using the optimization algorithm according to the traffic condition prediction result and the actual traffic condition assessment result is implemented by:
   obtaining prediction values of traffic flows of one or more road sections in the road network and prediction values of road traffic at intersections of the one or more road sections according to the traffic condition prediction result;
   acquiring a signal cycle and a signal green time of traffic signals at the intersections of the one or more road sections in the road network; and
   performing timing optimization on the traffic signals at the intersections of the one or more road sections in the road network.

9. The road traffic control system of claim 8, wherein the traffic flows of the one or more road sections in the road network comprise the numbers of vehicles, pedestrians and/or non-motor vehicles arriving at a section of a road in unit time.

10. The road traffic control system of claim 8, wherein the road traffic at the intersections comprises one or more parameters including at least a queuing length, a motor vehicle saturation rate, a motor vehicle arrival rate, an intersection pedestrian flow, and an effective red-light time.

11. The road traffic control system of claim 8, wherein the optimization algorithm comprises: a linear planning method, the timing optimization on the signals at the intersections of the one or more road sections in the road network is performed by using the linear planning method, parameters involved in a constraint condition thereof comprising a signal cycle, a queuing length, a maximum allowable delay time for pedestrians, and a maximum allowable delay time for motor vehicles.

12. The road traffic control system of claim 8, wherein the optimization objective comprises a difference between motor vehicle flows of the one or more road sections in the road network being less than a preset flow threshold.

13. The road traffic control system of claim 10, wherein a linear objective function used in the linear planning method is a total delay time in a road flow direction of each road section being equal to a sum of a delay time for motor vehicles in the road flow direction, a delay time for pedestrians at all non-crossroad street crossings in the road flow direction, and a crossing delay time for pedestrians at all crossroads, wherein:
the delay time for motor vehicles in the road flow direction is equal to a sum of delay times for motor vehicles on all branches leading to the road flow direction, and the delay time for motor vehicles on branches is equal to a product of an average vehicle delay time for the motor vehicles on branches and an instantaneous vehicle flow in the direction,
a delay time for pedestrians at all non-crossroad street crossings in the road flow direction is equal to a product of a sum of instantaneous flows of all street crossings in the flow direction of the road section and an average crossing delay time for pedestrians at non-crossroads,
a crossing delay time for pedestrians at all crossroads is equal to a product of a sum of pedestrian crossing flows at crossroads of all branches in the road flow direction and an average delay time for pedestrians at the crossroads, and
the control scheme is determined by calculating a minimum value of the linear objective function.

14. The road traffic control system of claim 13, wherein determining the control scheme by calculating the minimum value of the linear objective function comprises:
calculating a total delay time for all vehicles in the signal cycle; and
calculating an average delay time for each vehicle in the signal cycle according to a number of vehicles arriving in the signal cycle.

15. The road traffic control system of claim 13, wherein determining the control scheme by calculating the minimum value of the linear objective function comprises:
selecting a probability density function according to a negative exponential distribution met by time intervals between arrivals of motor vehicles at areas where motor vehicles conflict with pedestrians; and
calculating an average pedestrian delay time according to the negative exponential distribution and the probability density function.

16. The road traffic control system of claim 15, wherein the total delay time is equal to a sum of a delay time for motor vehicles in the road flow direction, a delay time for pedestrians at all non-crossroad street crossings in the road flow direction, and a crossing delay time for all pedestrians at the crossroad, wherein:
the delay time for motor vehicles in the road flow direction being equal to a sum of vehicle delay times for motor vehicles on all branches, wherein a vehicle delay time for motor vehicles on each branch is equal to a product of an average delay time for each motor vehicle on the respective branch and an instantaneous vehicle flow of the respective branch in the road flow direction; and the average delay time for each motor vehicle on the respective branch is equal to a sum of an average signal delay time of the respective branch in the road flow direction and an average motor vehicle delay time caused by a conflicting area between motor vehicles and pedestrians;
the delay time for pedestrians at all non-crossroad street crossings in the road flow direction being equal to a sum of signal delay times of the street crossings, wherein a signal delay time of each street crossing is equal to a signal delay time of the respective street crossing multiplied by an instantaneous pedestrian flow of the respective street crossing; and
the crossing delay time for all pedestrians at the crossroad being equal to a product of a pedestrian flow at the crossroad and an average pedestrian delay time at the crossroad, wherein the average pedestrian delay time at the crossroad is equal to a sum of pedestrian delay times caused by conflicting areas between motor vehicles and pedestrians on all branches plus an average signal delay time for each pedestrian at the crossroad;
wherein traffic light timing for pedestrians and non-motor vehicles and traffic light timing for motor vehicles are determined according to a minimum value of the total delay time.

17. The road traffic control system of claim 8, wherein a controllable traffic element of the one or more road sections in the road network is optimized according to the control scheme, and after optimization, an optimized traffic condition is assessed according to the traffic condition evaluation model based on a traffic condition parameter obtained after optimization to obtain an optimized traffic condition assessment result.

18. The road traffic control system of claim 8, wherein the traffic condition assessment result comprises a balance degree between traffic flows of the one or more road sections in the road network, congested road sections in the road network, and a number of the congested road sections.

19. A method implemented by one or more computing devices, the method comprising:
acquiring traffic condition parameters of a road network from video traffic information, the traffic condition parameters comprising at least a motor vehicle traffic condition parameter, and comprising at least one of a pedestrian traffic condition parameter or a non-motor vehicle traffic condition parameter;
predicting a traffic condition in a future period of time according to the traffic condition parameters to obtain a traffic condition prediction result;
assessing an actual traffic condition according to a traffic condition evaluation model based on the traffic condition parameters to obtain an actual traffic condition assessment result; and
determining a control scheme for a controllable traffic element using an optimization algorithm according to the traffic condition prediction result and the actual traffic condition assessment result, an optimization objective of the optimization algorithm including at least minimizing a sum of a delay time for pedestrians or non-motor vehicles and a delay time for motor vehicles.

20. One or more computer readable media storing executable instructions that, when executed by one or more processors, cause the one or more processors to perform acts comprising:
- obtain a traffic condition prediction result, the traffic condition prediction result comprising prediction values of traffic flows of one or more road sections in a road network and prediction values of road traffic at intersections of the road sections;
- acquire traffic condition parameters, the traffic condition parameters comprising a signal cycle and a signal green time of traffic signals at the intersections of the one or more road sections in the road network; and
- perform timing optimization on the traffic signals at the intersections of the one or more road sections in the road network based on the traffic condition prediction result; an optimization objective of the optimization including at least minimizing a sum of a delay time for pedestrians or non-motor vehicles and a delay time for motor vehicles.

* * * * *